United States Patent
Gingras et al.

(10) Patent No.: US 8,568,516 B2
(45) Date of Patent: Oct. 29, 2013

(54) BIOSAFETY CABINET FILTER REMOVAL DEVICES, SYSTEMS, AND METHODS

(75) Inventors: Ronald W. Gingras, Sanford, ME (US); Christopher Hersey, South Portland, ME (US); Aaron Johnson, Kennebunk, ME (US); Robert E. Lloyd, Kittery Point, ME (US); Larry A. McCarthy, Sanford, ME (US)

(73) Assignee: The Baker Company, Inc., Sanford, ME (US)

( * ) Notice: Subject to any disclaimer, the term of this patent is extended or adjusted under 35 U.S.C. 154(b) by 99 days.

(21) Appl. No.: 13/365,027

(22) Filed: Feb. 2, 2012

(65) Prior Publication Data

US 2013/0020249 A1    Jan. 24, 2013

Related U.S. Application Data

(60) Provisional application No. 61/572,846, filed on Jul. 22, 2011.

(51) Int. Cl.
  *B01D 46/00*    (2006.01)
(52) U.S. Cl.
  USPC ............... 95/273; 55/357; 55/385.2; 55/418; 55/478; 55/483; 55/484; 55/DIG. 18; 95/286
(58) Field of Classification Search
  USPC ............. 55/385.1, 385.2, 467, 480, 481, 506, 55/318, 357, 482, 485, 493, 504, 495, 55/DIG. 18, DIG. 46; 96/226; 95/273, 278, 95/279; 454/158, 187; 600/21; 128/205.26; 425/73
  See application file for complete search history.

(56) References Cited

U.S. PATENT DOCUMENTS

| | | | |
|---|---|---|---|
| 4,450,964 A | 5/1984 | Wood | |
| 4,613,348 A | 9/1986 | Natale | |
| 4,726,825 A | 2/1988 | Natale | |
| 5,017,197 A | 5/1991 | McGuire et al. | |
| 5,259,854 A | 11/1993 | Newman | |
| 5,837,040 A * | 11/1998 | Caughron et al. | 96/224 |
| 6,149,699 A | 11/2000 | Grantham | |
| 6,364,923 B1 * | 4/2002 | Wiedmeyer et al. | 55/385.2 |
| 6,749,499 B1 * | 6/2004 | Snyder | 454/289 |
| 7,393,373 B1 * | 7/2008 | Krippner et al. | 55/385.2 |
| 7,566,354 B2 | 7/2009 | Ryan et al. | |
| 2008/0173178 A1 * | 7/2008 | Metteer | 95/286 |
| 2008/0278042 A1 | 11/2008 | McCarthy et al. | |

* cited by examiner

*Primary Examiner* — Duane Smith
*Assistant Examiner* — Minh-Chau Pham
(74) *Attorney, Agent, or Firm* — Morse, Barnes-Brown & Pendleton, P.C.; Sean D. Detweiler, Esq.

(57) ABSTRACT

A biosafety cabinet device includes one or more walls forming a housing, a work area contained within the housing, a filter in fluid communication with the work area for filtering fluid passing through and exiting the work area. The filter includes a primary filtration surface through which a majority of fluid being filtered by the filter passes. A filter removal device is configured to couple to the filter. The filter removal device includes a rigid barrier layer and one or more handling mechanisms adjoined with the rigid barrier layer and extending distal to the rigid barrier layer. When the filter removal device is securely coupled to the filter, the rigid barrier layer extends substantially across a non-peripheral portion of the primary filtration surface of the filter and allows passage of fluid from the work area through the primary filtration surface of the filter.

24 Claims, 20 Drawing Sheets

BIOSAFETY CABINET FILTER REMOVAL DEVICES, SYSTEMS, AND METHODS

RELATED APPLICATIONS

This application claims priority to, and the benefit of U.S. Provisional Application No. 61/572,846, filed Jul. 22, 2011, for all subject matter common to both applications. The disclosure of said provisional application is hereby incorporated by reference in its entirety.

FIELD OF THE INVENTION

The present invention relates to biological safety cabinets (hereinafter referred to as "biosafety cabinets," in accordance with industry standards) for providing personnel, product, and environmental protection. Specifically, the present invention pertains to biosafety cabinets suitable for protecting the user and surrounding environment from potentially harmful substances during operation thereof as well as protection of the product from contamination from outside sources. More particularly, the present invention provides a filter removal device and system for safely removing filters of the biosafety cabinet without exposing a user or maintenance worker to the potentially harmful chemical substances captured by the filters.

BACKGROUND OF THE INVENTION

Biosafety cabinets utilize filtration systems for filtering substances from an air flow through a work area thereof. The air flow is generated to maintain a negative pressure relative to the environment external to the biosafety cabinet, which prevents contaminants contained within the work area from being released or exposed to a user during operation. Oftentimes, contaminants that are captured on the surface of the filters of a biosafety cabinet filtration system are extremely hazardous and must be safely secured to ensure personnel and environmental protection. The working filtration surface (e.g., the filter face) of a filter contains the highest amount of such hazardous material, and thus creates the highest risk to the user or maintenance worker.

Filters in a biosafety cabinet must be periodically changed. The frequency of the change will vary by type of biosafety cabinet, the type of contaminants being filtered, the frequency of use, and the environment within the biosafety cabinet, among other factors. In order to protect the maintenance worker and the external environment, the filters must be sealed prior to being removed from the cabinet. This is commonly achieved by turning off the biosafety cabinet, placing the filter in one or more plastic bags, sealing the bags, and transporting for final destruction and/or disposal. More specifically, this replacement methodology requires shutdown of the biosafety cabinet supply fan to avoid issues with pressurization or depressurization of the plastic hag while being placed over the filter. In general, the external cabinet exhaust system must remain on, since shutting down both the supply fan and external cabinet exhaust system can compromise the ability to contain harmful chemical substances within the biosafety cabinet.

However, such known replacement systems are associated with numerous drawbacks. As just one example, they often require large, pre-installed equipment that holds both the filter and the bag in place. This adds to the overall costs and manufacturing expenses of the biosafety cabinet.

Still other known systems attempt to achieve safe removal by placing the filters at positions away from the work area, which often cannot be reached by a user or maintenance worker without use of a ladder. Such systems only offer limited visibility and mobility to the user or maintenance worker, who must perform the removal process on a ladder in full safety gear. Accordingly, such known systems may endanger the user or maintenance worker and create additional risks to the external environment. Dropping a contaminated filter from ladder height can allow the contaminant to spread (e.g., by diffusion) not only over an entire floor but also throughout an entire building, depending on the particular substance.

Accordingly, known systems demonstrate multiple shortcomings to the provision of a safe, convenient, and cost-effective way to remove and replace filters in a biosafety cabinet.

SUMMARY

Accordingly, there is a need for systems, devices, and methods for efficiently, safely, and conveniently removing filters in a biosafety cabinet. The present invention is directed toward solutions to address this need, in addition to having other desirable characteristics that will be appreciated by one of skill in the art upon reading the present specification.

In accordance with one example embodiment of the present invention, a biosafety system can include a biosafety cabinet device. The biosafety cabinet device can include one or more walls forming a housing, a work area contained within the housing, and a first filter in fluid communication with the work area for filtering fluid passing through and exiting the work area. The first filter can include a primary filtration surface through which a majority of fluid being filtered by the first filter passes. The biosafety system can include a fluid permeable filter removal device, which can be configured to couple with the first filter. The fluid permeable filter removal device can include a rigid barrier layer and one or more handling mechanisms adjoined with the rigid barrier layer and extending distal to the rigid barrier layer. When the fluid permeable filter removal device is securely coupled to the first filter, the rigid barrier layer can extend substantially across a non-peripheral portion of the primary filtration surface of the first filter and can allow passage of fluid from the work area through the primary filtration surface of the first filter.

In accordance with further embodiments of the present invention, the biosafety cabinet device further can include a second filter in fluid communication with the work area for filtering fluid passing through and exiting the work area. The second filter can include a primary filtration surface through which a majority of fluid being filtered by the second filter passes. The biosafety system additionally can include a fluid impermeable filter removal device configured to couple to the second filter. The fluid impermeable filter removal device can include a rigid barrier layer and one or more handling mechanisms adjoined with the rigid barrier layer and extending distal to the rigid barrier portion. When the fluid impermeable filter removal device is securely coupled to the second filter, the rigid barrier layer can extend across an entirety of the primary filtration surface of the second filter, can seal off the primary filtration surface of the second filter, and can prevent passage of fluid from the work area through the primary filtration surface of the second filter.

In accordance with further embodiments of the present invention, the biosafety system can include a fluid impermeable filter removal device configured to couple to the fluid permeable filter removal device. The fluid impermeable filter removal device can include a rigid barrier layer and one or more handling mechanisms adjoined with the rigid barrier layer and extending distal to the rigid barrier portion. When the fluid impermeable filter removal device is securely coupled to the fluid permeable filter removal device, the rigid barrier layer of the fluid impermeable filter removal device can extend across an entirety of at least the primary filtration surface of the first filter, can seal off the primary filtration surface of the first filter, and can prevent passage of fluid from the work area through the primary filtration surface of the first filter.

In accordance with further embodiments of the present invention, the rigid barrier layer of the fluid permeable filter removal device can prevent filtered substance on or in the primary filtration surface of any filter from contacting the one or more handling mechanisms of the fluid impermeable filter removal device. The one or more handling mechanisms of the fluid permeable filter removal device can include one or more of a handle, a hook, a knob, an overhanging portion, a strap, or an embossed structure. The o one or more handling mechanisms of the fluid permeable filter removal device can be removable from the rigid barrier layer of the fluid permeable filter removal device. The rigid barrier layer of the fluid permeable filter removal device can include a rigid plate having one or more through-holes disposed therein. The fluid permeable filter removal device can be configured to releasably couple to the first filter. The fluid permeable filter removal device can be configured to couple to a frame of the first filter. When the fluid permeable filter removal device is securely coupled to the first filter, the rigid barrier layer of the fluid permeable filter removal device can extend across and cover only a portion of the primary filtration surface of the first filter. When the fluid permeable filter removal device is securely coupled to the first filter, the rigid barrier layer of the fluid permeable filter removal device can extend across and cover all of the primary filtration surface of the first filter. The biosafety system further can include a flexible containment enclosure having a size and shape sufficient to enclose the first filter and the fluid permeable filter removal device when coupled thereto. The rigid barrier layer of the fluid permeable filter removal device can include a perimeter forming one or more indentations for allowing passage of fluid therethrough. The biosafety system further can include a fluid impermeable filter removal device configured to couple to the first filter. The fluid impermeable filter removal device can include a rigid barrier layer and one or more handling mechanisms adjoined with the rigid barrier layer and extending distal to the rigid barrier layer. The fluid impermeable filter removal device can be configured to securely coupled to the first filter in such a way that the rigid barrier layer of the fluid impermeable filter removal device extends across an entirety of an additional surface of the first filter through which fluid is configured to flow and seals off the additional surface of the first filter.

In accordance with another embodiment of the present invention, a method is provided for securing a first filter of a biosafety cabinet device. The first filter can be in fluid communication with a work area and can be configured to filter fluid passing through and exiting the work area. The first filter can include a primary filtration surface through which a majority of fluid being filtered by the first filter passes. The method can include providing a fluid permeable filter removal device that includes a rigid barrier layer and one or more handling mechanisms adjoined with the rigid barrier layer and extending distal to the rigid barrier layer. The fluid permeable filter removal device can be securely coupled to the first filter in such a way that the rigid barrier layer extends substantially across a non-peripheral portion of the primary filtration surface of the first filter and allows passage of fluid from the work area through the primary filtration surface of the first filter.

In accordance with further embodiments of the present invention, subsequent to the step of securely coupling the fluid permeable filter removal device, one or more sealing mechanisms sealing one or more edges of the first filter can be disabled, whereby air is enabled to pass around the one or more edges of the first filter. The first filter and the fluid permeable filter removal device coupled thereto can be placed in a containment enclosure, and the containment enclosure can be sealed. The first filter and the fluid permeable filter removal device coupled thereto can be removed from the biosafety cabinet.

In accordance with other further embodiments of the present invention, a fluid impermeable filter removal device can be provided that includes a rigid barrier layer and one or more handling mechanisms adjoined with the rigid barrier layer and extending distal to the rigid barrier layer. The fluid impermeable filter removal device can be securely coupled to the fluid permeable filter removal device such that the rigid barrier layer of the fluid impermeable filter removal device prevents passage of fluid from the work area through the primary filtration surface of the first filter. The first filter, the fluid permeable filter removal device coupled thereto, and the fluid impermeable filter removal device coupled thereto can be placed in a containment enclosure. The containment enclosure can be sealed and disposed of. Prior to the step of coupling the fluid permeable filter removal device to the first filter, a work surface can be removed from the biosafety cabinet.

In accordance with yet other further embodiments of the present invention, an additional fluid permeable filter removal device can be provided that includes a rigid barrier layer and one or more handling mechanisms adjoined with the rigid barrier layer and extending distal to the rigid barrier layer. The additional fluid permeable filter removal device can be securely coupled to a second filter included in the biosafety cabinet in such a way that the rigid barrier layer extends substantially across a non-peripheral portion of the primary filtration surface of the first filter and allows passage of fluid from the work area through the primary filtration surface of the first filter. A fluid impermeable filter removal device can be provided that includes a rigid barrier layer and one or more handling mechanisms adjoined with the rigid barrier layer and extending distal to the rigid barrier layer. The fluid impermeable filter removal device can be securely coupled to the fluid permeable filter removal device such that the rigid barrier layer of the fluid impermeable filter removal device prevents passage of fluid from the work area through the primary filtration surface of the first filter. The first filter, the fluid permeable filter removal device coupled thereto, and the fluid impermeable filter removal device coupled thereto can be removed. The additional fluid permeable filter removal device can be released from the second filter. The released additional fluid permeable filter removal device can be removed from the biosafety cabinet.

In accordance with yet other further embodiments of the present invention, a fluid impermeable filter removal device can be provided that includes a rigid barrier layer and one or more handling mechanisms adjoined with the rigid barrier layer and extending distal to the rigid barrier layer. The fluid impermeable filter removal device can be securely coupled to an additional surface of the first filter through which fluid is configured to pass, such that the rigid barrier layer of the fluid impermeable filter removal device seals off the additional surface of the first filter.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1A:
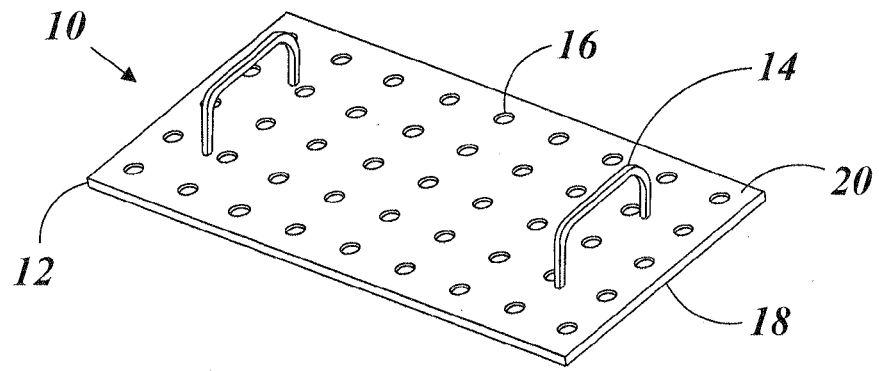
FIGS. 1A, 1B, and 1C are a perspective view, side view, and top view, respectively, of a fluid permeable filter removal device, according to example embodiments of the present invention.

An illustrative embodiment of the present invention relates to a filter removal device and system for safely removing a contaminated filter from a biosafety cabinet. The filter removal device includes a rigid barrier layer and one or more handling mechanisms adjoined with and extending distal to (e.g., away from) the rigid barrier layer. When coupled to the filter, the rigid barrier layer extends across a non-peripheral portion of a primary filtration surface of the filter, on which potentially harmful filtered substances may reside. The rigid barrier layer is permeable to fluid, and thus allows air flow through the work area to continue while the filter removal device is situated on and coupled with the filter. Thus, the filter removal device allows a user or maintenance worker to safely engage the filter and thereby cover the primary filtration surface of the filter without making direct contact with the primary filtration surface. The user or maintenance worker then can lift the filter out of place by gripping the handling mechanisms, and can remove the filter and the filter removal device. Optionally, the user or maintenance worker can couple a fluid non-permeable filter removal device to the fluid permeable filter removal device prior to lifting the filter out of place. Once removed from its place within the biosafety cabinet, the filter and any filter removal devices coupled thereto can be enclosed within a secure containment enclosure, which then can be sealed and safely discarded.

FIGS. 1A through 15B, wherein like parts are designated by like reference numerals throughout, illustrate example embodiments of systems and methods for using a filter removal device, according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

Figure 1B:
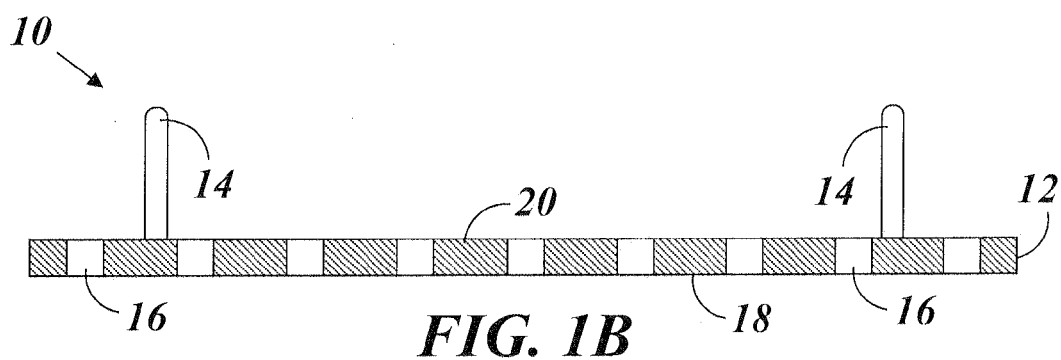
Figure 1C:
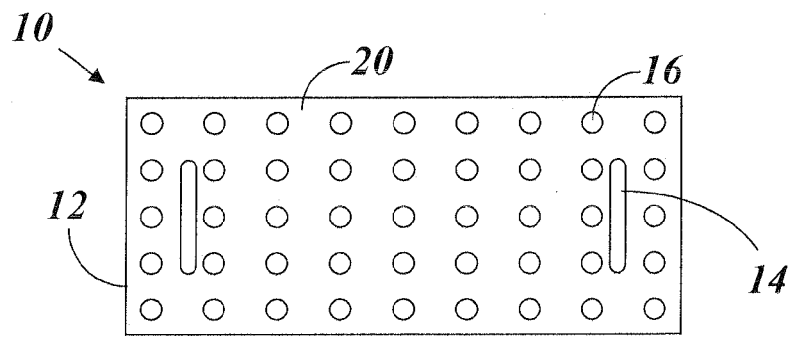

Turning now to FIGS. 1A through 1C, a perspective view, a side view, and a top view, respectively, are depicted of a fluid permeable filter removal device 10, according to an example embodiment of the present invention. The fluid permeable filter removal device 10 includes a rigid barrier layer 12 and one or more handling mechanisms 14. The rigid barrier layer 12 can include a plurality of through-holes 16 disposed therein. The through-holes 16 can be sized to permit air, gas, or other fluid to flow therethrough. The rigid barrier layer 12 can be constructed from any suitable material, including, as non-limiting examples, metal, plastic, wood, silicon, any other suitable materials, and any combination thereof.

Figure 2A:
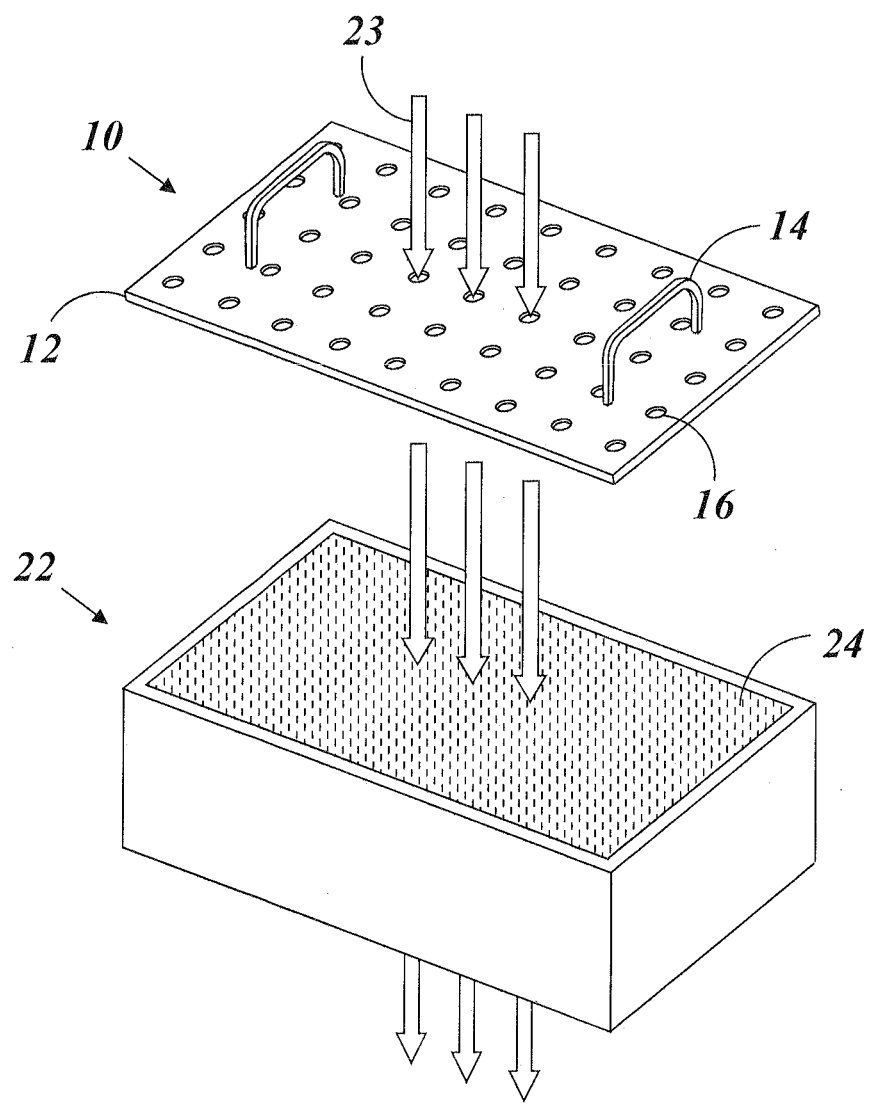
FIG. 2A is a perspective view of the fluid permeable filter removal device of FIGS. 1A through 1C being coupled to a filter, according to aspects of the present invention.
Figure 2B:
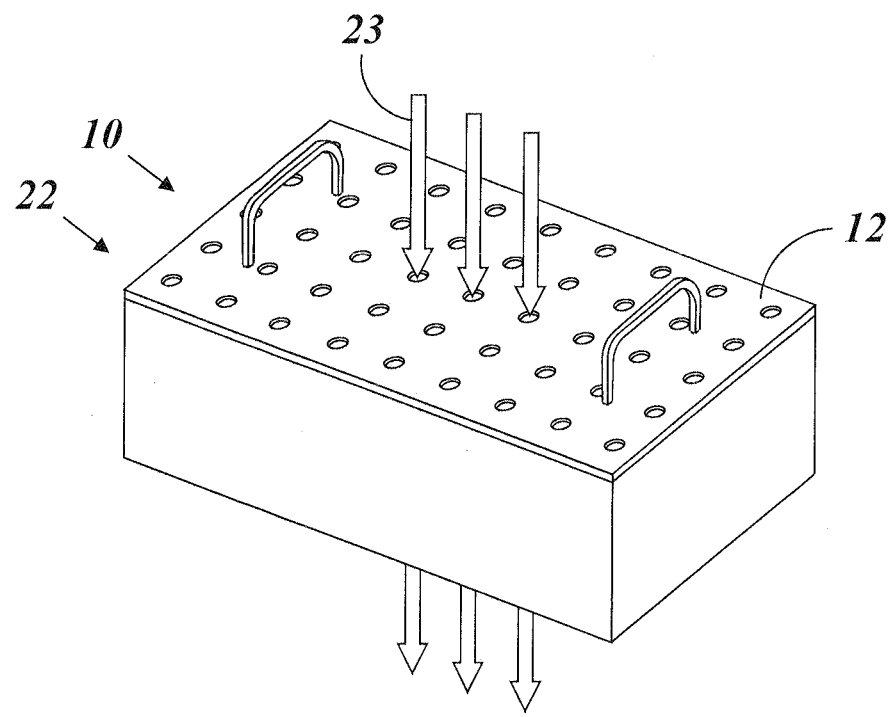
FIG. 2B is a perspective view of the fluid permeable filter removal device coupled to the filter of FIG. 2A, according to aspects of the present invention.

The fluid permeable filter removal device 10 can be configured to securely couple and engage with a filter in a biosafety cabinet. For example, FIG. 2A depicts an exploded view of a system in which the fluid permeable filter removal device 10 is securely coupled to a filter 22. FIG. 2B further depicts the system of FIG. 2A from a perspective view. When coupled thereto, the fluid permeable filter removal device 10 allows a fluid 23 (e.g., air) to flow through the fluid permeable filter removal device 10 (e.g., through the through-holes 16) and thus to continue on through the filter 22. The fluid permeable filter removal device 10 generally can include one or more attachment mechanisms for securely coupling to the filter 22. As non-limiting examples, the fluid permeable filter removal device 10 can include one or more turn-and-lock fastening mechanisms, one or more male fastening members (e.g., protrusions configured to fit within one or more recesses in a biosafety cabinet filter, etc.), one or more female fastening members (e.g., one or more slots or channels configured to receive one or more knobs or other protrusions on a biosafety cabinet filter, etc.), one or more fasteners (e.g., one or more screws configured to fit into one or more threaded holes in the filter 22, one or more self-tapping screws or self-drilling screws configured to screw into wood, aluminum, etc.), one or more adhesives (e.g., glue, tape, etc.), one or more adhesive surfaces on the filter 22 or the fluid permeable filter removal device 10, surfaces on the filter 22 and the fluid permeable filter removal device 10 configured to become adjoined upon receiving heat treatment, or any other fastening mechanism. For example, in some embodiments, the attachment mechanism includes one or more adhesives applied to a peripheral portion along a perimeter of a first surface 18 of the rigid barrier layer 12 that substantially opposes a second surface 20 at which the handling mechanisms 14 are adjoined.

Figure 3:
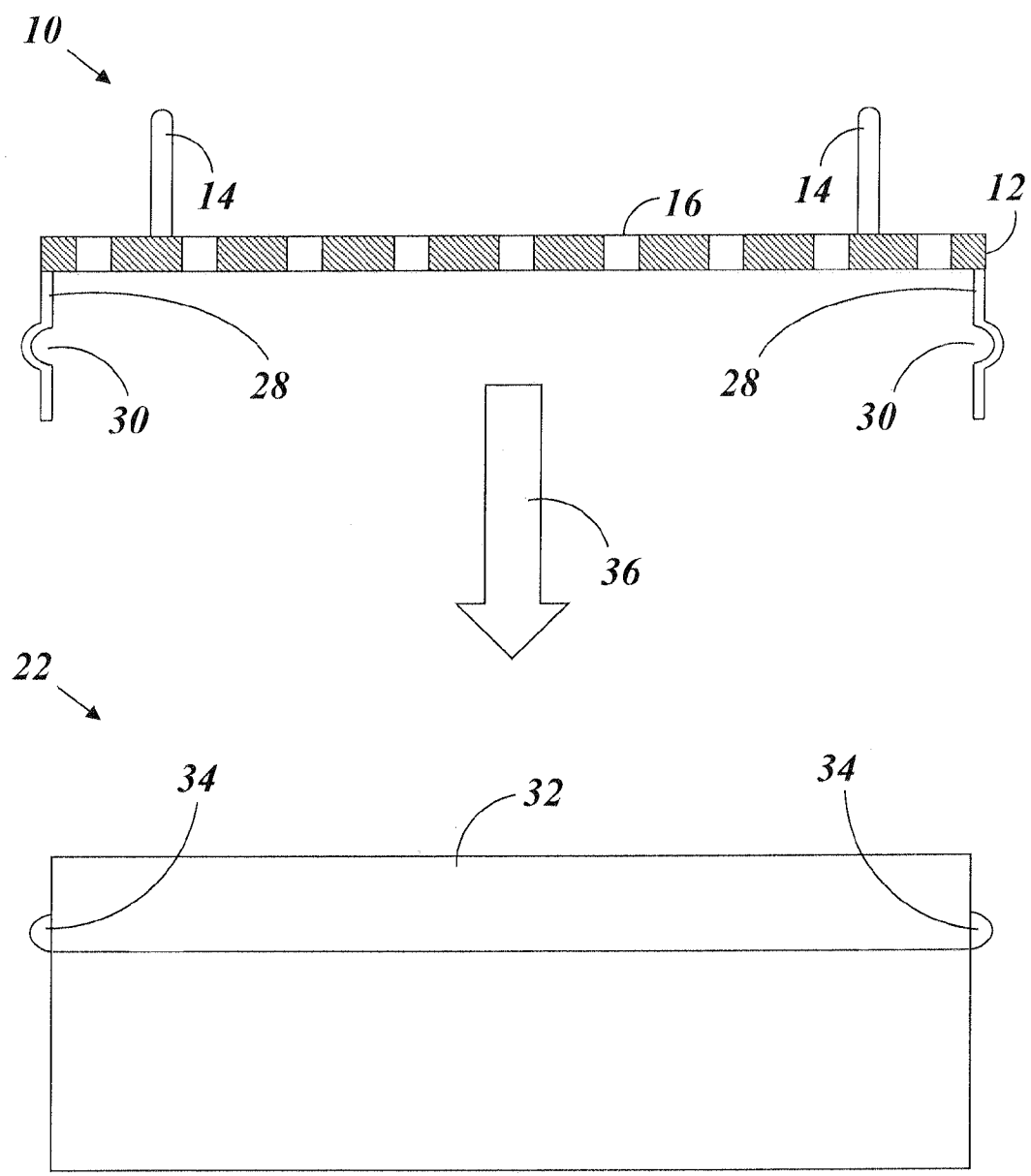
FIG. 3 is a side view of a fluid permeable filter removal device having one or more indentations for being received by a detent on a frame filter, according to aspects of the present invention.

In other embodiments, such as the example embodiment depicted in FIG. 3, the fluid permeable filter removal device 10 can include at least one or more rigid surfaces 28 extending out from the rigid barrier layer 12 having a shape (e.g., which includes an indentation 30) configured to securely engage and couple with a frame 32 of a biosafety cabinet filter, e.g., which has one or more detents 34 shaped to conform to the indentation 30 of the fluid permeable filter removal device 10. As non-limiting examples, the one or more rigid surfaces 28 can be a single surface forming a rim with a lip, or can be two or more discontinuous opposing surfaces. The indentations 30 and the detents 34 can be sized and shaped to create friction fit with one another, e.g., so as to lock the fluid permeable filter removal device 10 in place once properly slid over the frame 32 in a direction indicated by arrow 36.

Returning now to FIG. 1, the rigid barrier layer 12 can have a shape forming one or more faces (e.g., surfaces 18, 20) that are generally rectangular, circular, triangular, square, polygonal, or another shape. Furthermore, the faces (e.g., surfaces 18, 20) of the rigid barrier layer 12 can conform to a primary filtration surface 24 on the filter 22. A "primary filtration surface," as used herein, refers to a surface of a filter through which fluid flow passes and is thereby filtered, and which is a primary such surface for performing filtration in the filter. Accordingly, one or more of the surfaces 18, 20 can be sized to extend across and cover substantially all of the primary filtration surface 24 of a filter 22 of a biosafety cabinet when coupled and secured thereto. Alternatively, one or more the surfaces 18, 20 can be sized to extend across and cover a portion (e.g., a highest risk or most contaminated portion) of the primary filtration surface 24. Accordingly, when coupled to a biosafety cabinet filter with an air flow therethrough, the fluid permeable filter removal device 10 can reduce or eliminate the exposure of a maintenance worker or other user to one or more substances (e.g., contaminants) due to the air flow maintaining the one or more substances (e.g., contaminants) on the primary filtration surface 24 of the filter 22. This prevents the one or more substances (e.g., contaminants) from escaping into the environment external to the biosafety cabinet.

Figure 4:
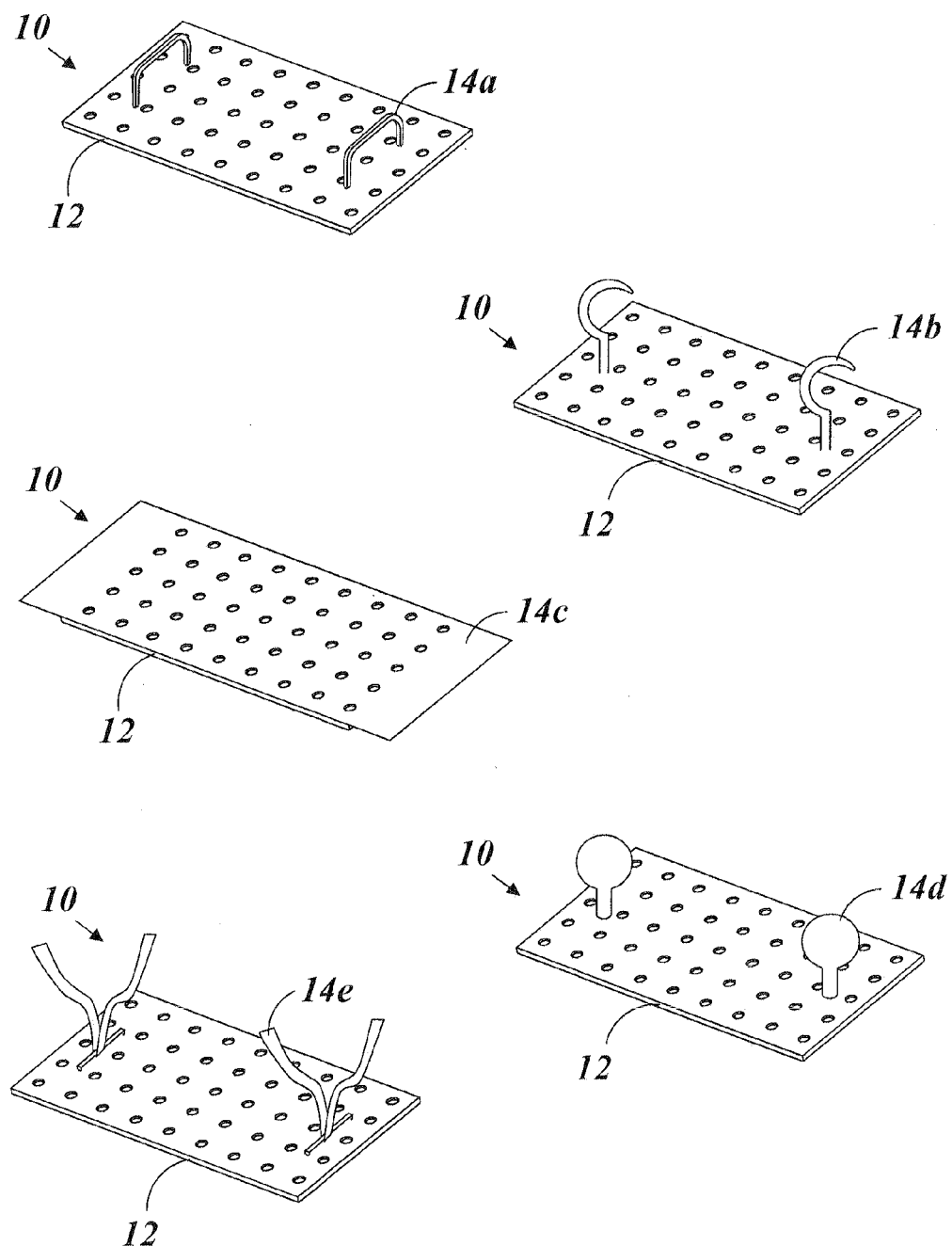
FIG. 4 is a perspective view of a plurality of different illustrative handling mechanisms suitable for use with embodiments of the present invention.

The one or more handling mechanisms 14 can include any device, portion of a device, or apparatus suitable for enabling the fluid permeable filter removal device 10 to be handled without making direct contact. The handling mechanisms 14 generally can be permanently affixed to the rigid barrier layer 12 (in an operationally permanent manner), or can be operationally detachable from the rigid barrier layer 12. The handling mechanisms 14 can extend distal to the rigid barrier layer 12, thereby enabling a maintenance worker or other user to contact the handling mechanisms 14 without making direct contact with any portion of the rigid barrier layer 12 configured to be in direct contact with the filter 22 (e.g., the filter housing). For example, as depicted in FIG. 4, the handling mechanisms 14 more specifically can include one or more of: handle 14a, a hook 14b, an overhanging portion 14c of the rigid barrier layer 12 configured to overhang one or more edges of the filter 22, a knob 14d, a strap 14e, or any other handling mechanism 14 (e.g., an embossed structure, etc.) for allowing the fluid permeable filter removal device 10 to be handled while preventing contact with the rigid barrier layer 12. Yet other handling mechanisms 14 are possible and will be appreciated by one of skill in the art. All such variations and alternatives are contemplated within the scope of the present invention.

Figure 5:
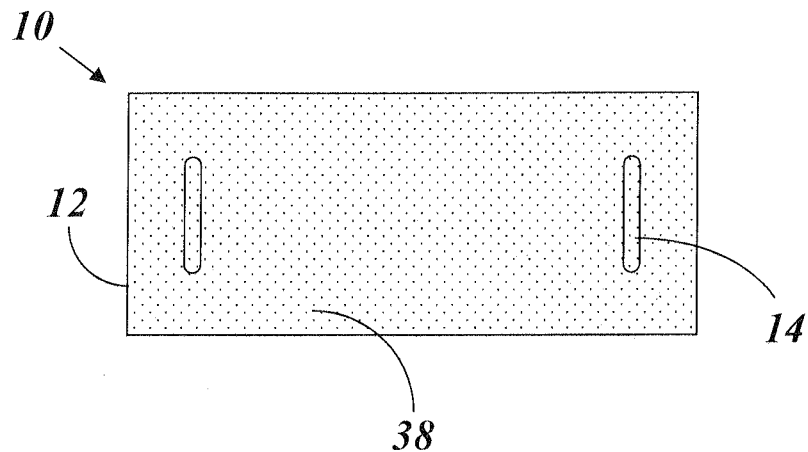
FIG. 5 is top view of a plurality of different illustrative fluid permeable rigid barrier layers, according to aspects of the present invention.
Figure 5:
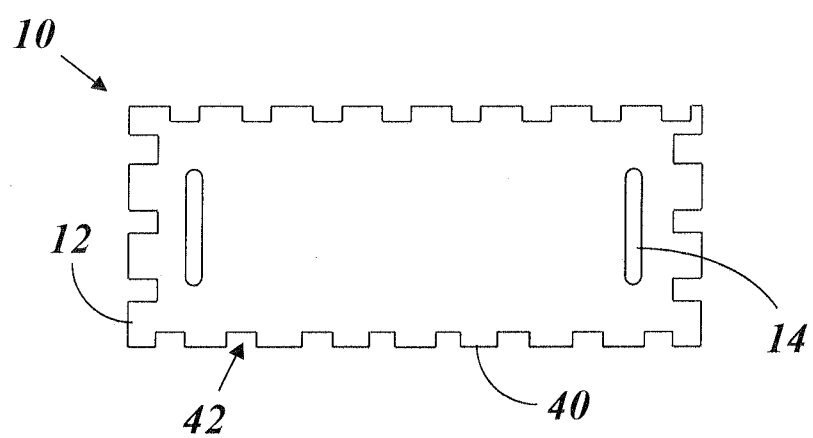
Figure 5:
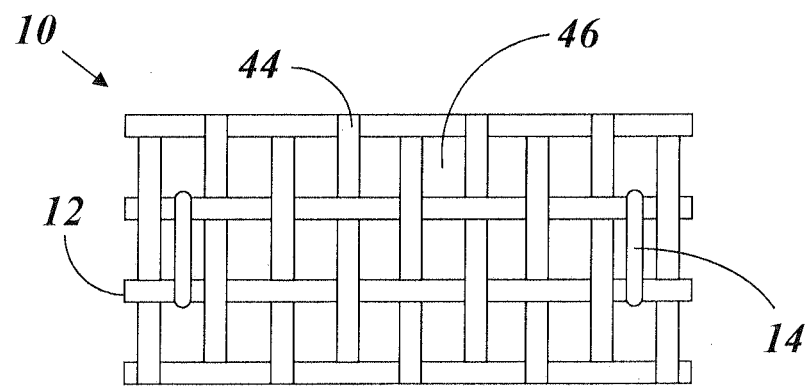

Although the embodiment of FIGS. 1A through 1C is depicted with reference to through-holes 16, the rigid barrier layer 12 of the fluid permeable filter removal device 10 alternatively or additionally can include one or more of perforations, pores, indentations, slots, and the like, for allowing fluid flow to pass through the rigid barrier layer 12. For example, FIG. 5 depicts several alternative embodiments of the fluid permeable filter removal device 10 for enabling fluid flow through the rigid barrier layer 12. Specifically, FIG. 5 depicts a first alternative embodiment of the fluid permeable filter removal device 10 having a rigid barrier layer 12 made of porous material having a plurality of pores 38 disposed therein and sufficiently sized to allow fluid to flow therethrough. FIG. 5 also depicts a second alternative embodiment of the fluid permeable filter removal device 10 having a perimeter 40 forming one or more indentations 42 enabling fluid to flow therethrough. In addition, FIG. 5 also depicts a third alternative embodiment of the fluid permeable filter removal device 10 constructed of weavings 44, which form openings 46 that allow fluid to flow therethrough. Yet other through-holes 16 are possible and will be appreciated by one of skill in the art. All such variations and alternatives are contemplated within the scope of the present invention.

Figure 6A:
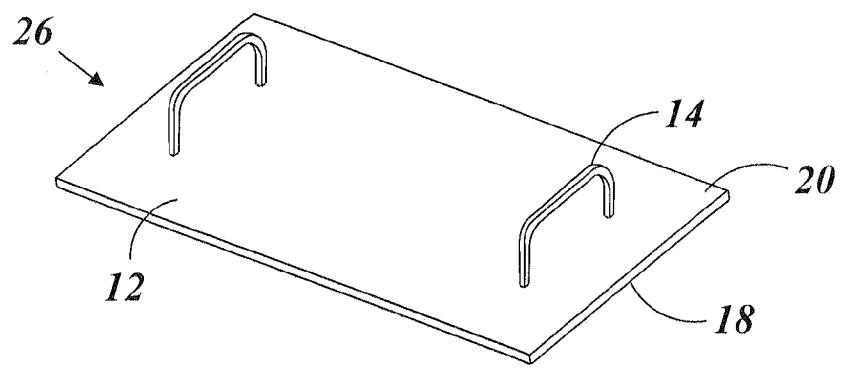
FIGS. 6A, 6B, and 6C are a perspective view, a side view, and a top view, respectively, of a fluid impermeable filter removal device, according to aspects of the present invention.
Figure 6B:
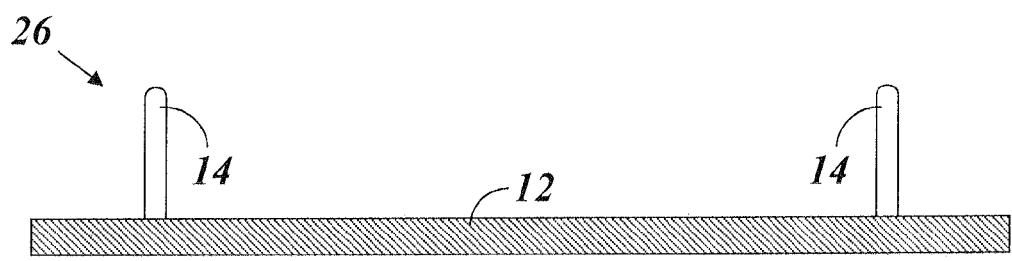
Figure 6C:
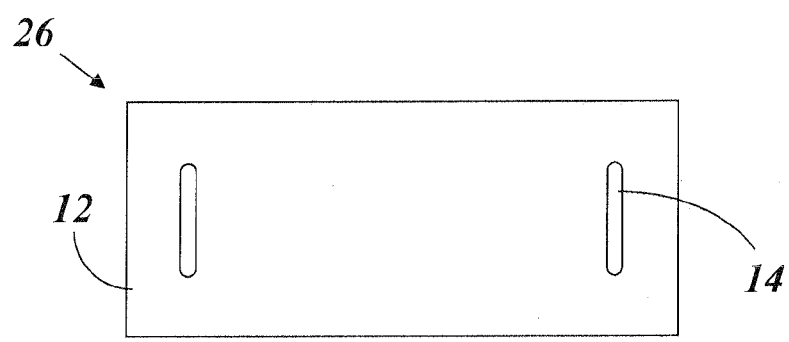

In addition to the fluid permeable filter removal device 10 of FIGS. 1A through 1C, certain embodiments of the present invention also provide fluid impermeable filter removal devices, which prevent both the passage of fluid and the passage of substances (e.g., contaminants and harmful chemical particulates) situated on the primary filtration surface 24 of the filter 22. For such fluid impermeable filter removal devices, fluid flow is prevented from passing through the fluid impermeable filter removal device. For example, one example of such a fluid impermeable filter removal device 26 is depicted in FIGS. 6A through 6B. The fluid impermeable filter removal device 26 includes the rigid barrier layer 12 with no fluid permeable through-openings, pores, indentations, etc. situated therein for enabling passage of fluid therethrough. Accordingly, securely coupling the fluid impermeable filter removal device 26 to the filter 22 results in the fluid impermeable filter removal device 26 preventing passage of fluid therethrough. As with the fluid permeable filter removal device 10, the fluid impermeable filter removal device 26 can include the one or more handling mechanisms 14 (e.g., which can be any one or more of the handling mechanisms 14a-e of FIG. 4). The one or more handling mechanisms 14 can be permanently or removably coupled to the rigid barrier layer 12 of the fluid impermeable filter removal device 26.

The fluid impermeable filter removal device 26 can include one or more fastening mechanisms. For example, the fluid impermeable filter removal device 26 can include any of the one or more attachment mechanisms described herein with reference to the fluid permeable filter removal device 10. In any given embodiment, the one or more fastening mechanisms included in the fluid permeable filter removal device 10 and the fluid impermeable filter removal device 26 can be the same or can be different from one another. The one or more fastening mechanisms included in the fluid impermeable filter removal device 26 can enable secure coupling by the fluid impermeable filter removal device 26 either with the filter 22 (e.g., with the frame 32 of the filter 22, as depicted in the example embodiment of FIG. 3) or with the fluid permeable filter removal device 10. For example, in some embodiments, the fluid impermeable filter removal device 26 is configured to securely couple directly to the filter 22. In other embodiments, however, the fluid impermeable filter removal device 26 is configured to securely couple to the fluid permeable filter removal device 10, which securely couples to the filter 22.

Figure 7A:
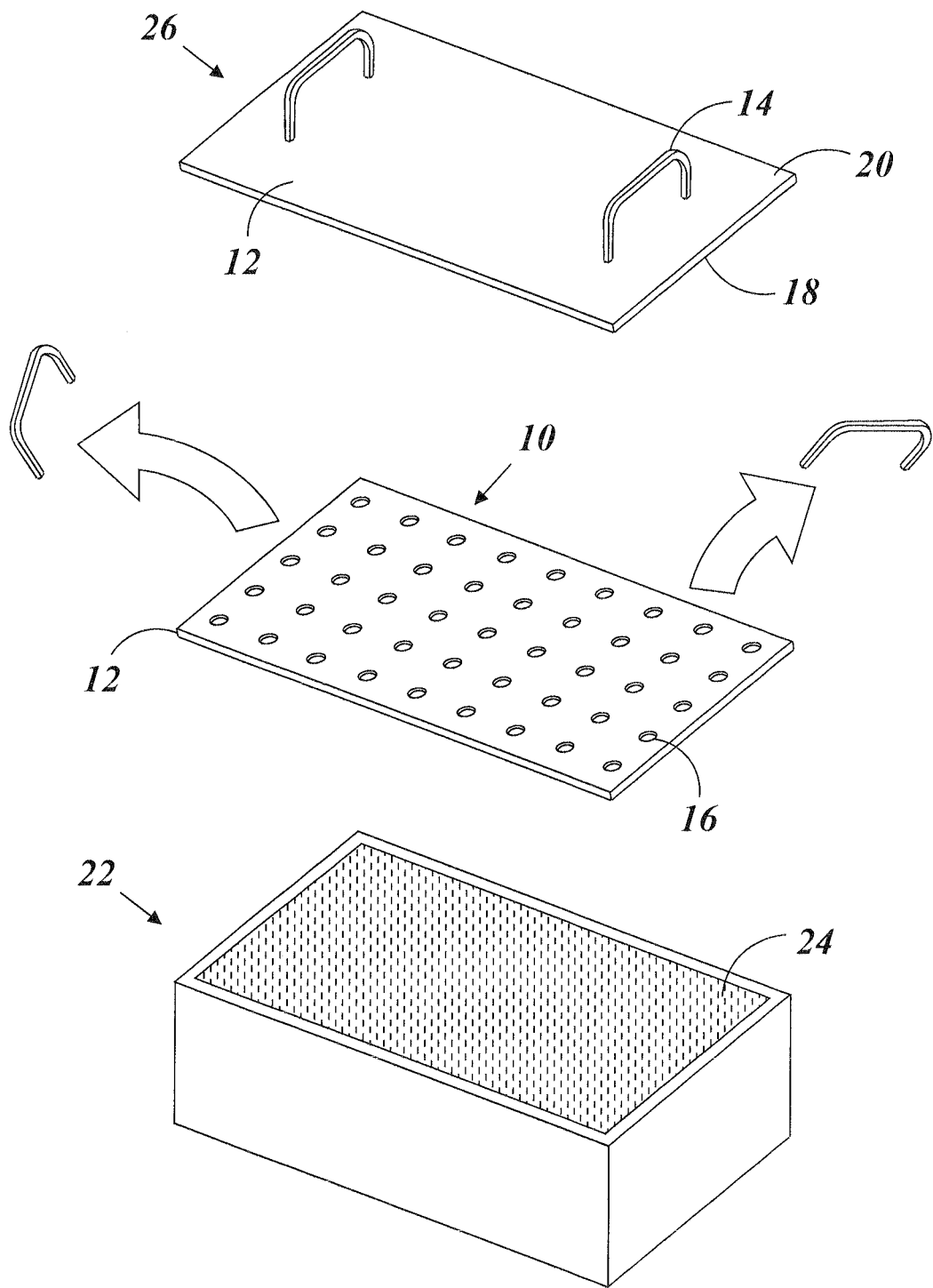
FIG. 7A is a perspective view of a filter, a fluid permeable filter removal device being coupled to the filter, and a fluid impermeable filter removal device being coupled to the fluid permeable filter removal device, according to aspects of the present invention.
Figure 7B:
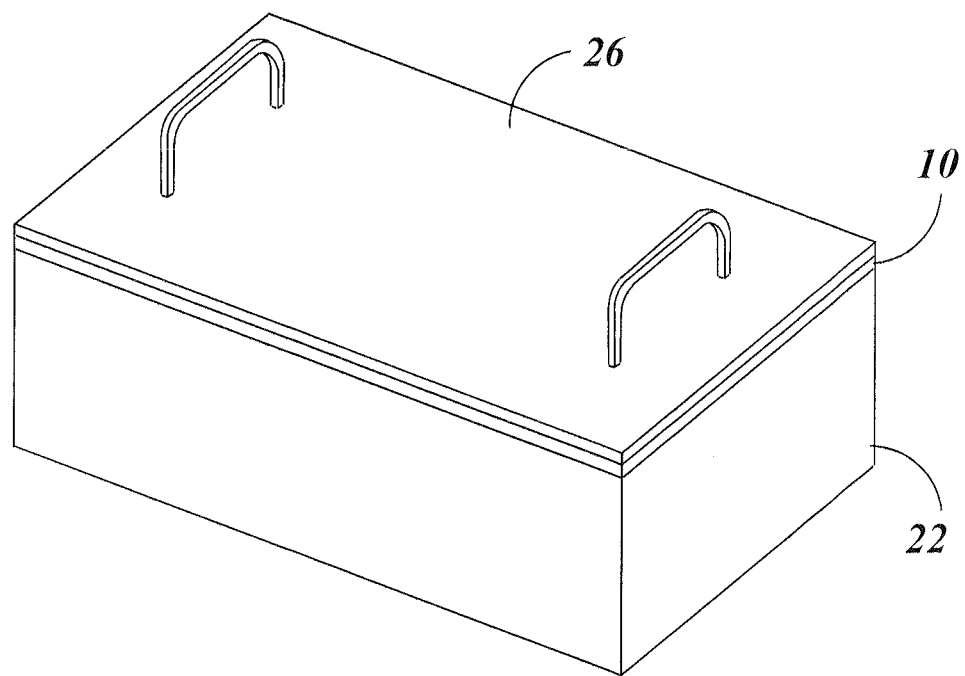
FIG. 7B is a perspective view of the filter, fluid permeable filter removal device coupled thereto, and the fluid impermeable filter removal device coupled to the fluid permeable filter removal device of FIG. 7A, according to aspects of the present invention.
Figure 8A:
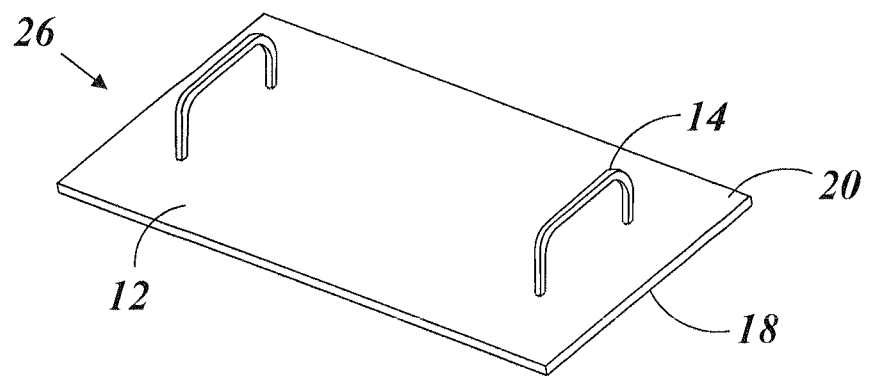
FIG. 8A is a perspective view of a filter and a fluid impermeable filter removal device being coupled thereto, according to aspects of the present invention.
Figure 8A:
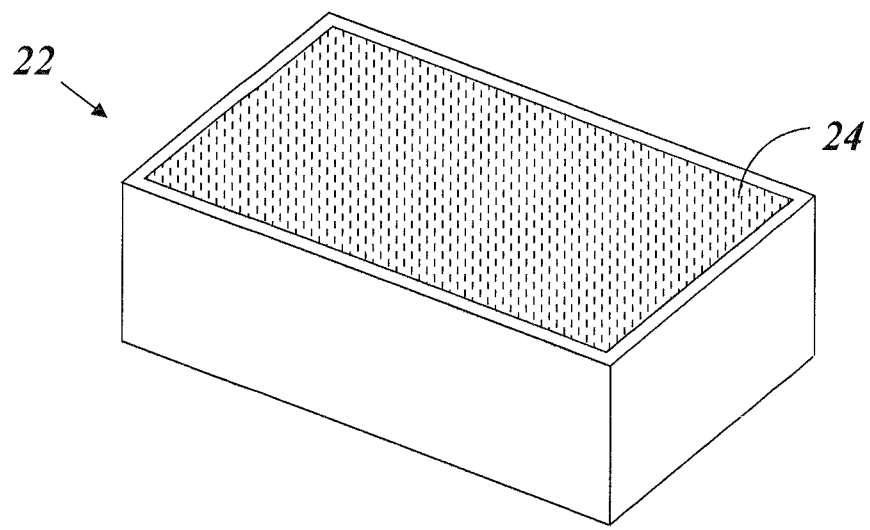
Figure 8B:
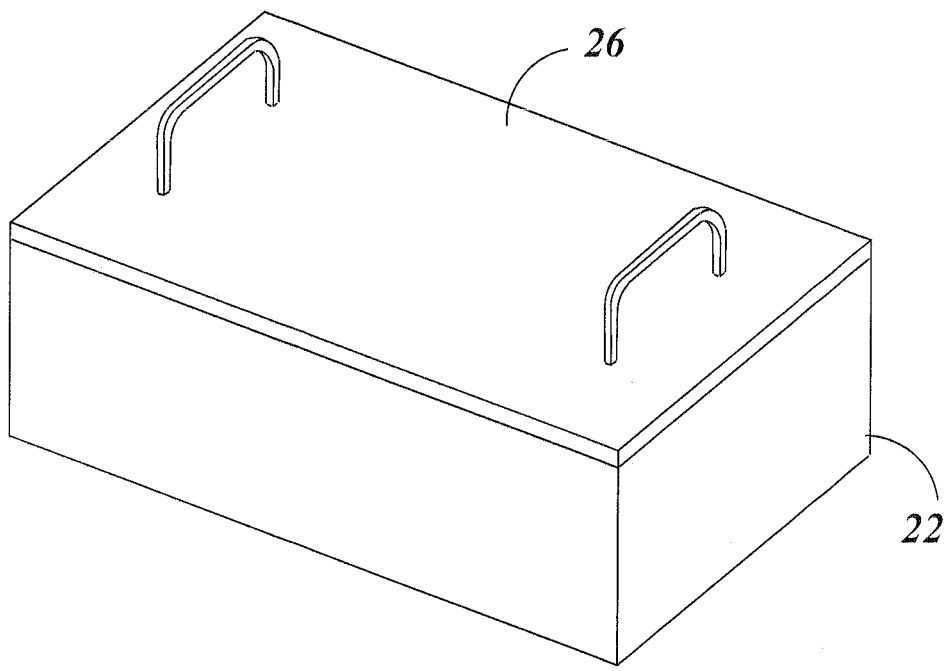
FIG. 8B is a perspective view of the filter and the fluid impermeable filter removal device coupled thereto of FIG. 8A, according to aspects of the present invention.

For example, FIG. 7A depicts an exploded view of a system in which the filter 22 is securely coupled to the fluid permeable filter removal device 10, which is securely coupled to the fluid impermeable filter removal device 26. In the system of FIG. 7A, the handling mechanisms 14 of the fluid permeable filter removal device 10 can be removable, so as to be removed after securing the fluid permeable filter removal device 10 to the filter 22 and before coupling the fluid impermeable filter removal device 26 to the fluid permeable filter removal device 10. However, one of skill in the art will appreciate that other handling mechanisms 14 (e.g., any one or more of the handling mechanisms of FIG. 4) can be used in place of or in addition to the removable handles depicted in FIG. 7A. Furthermore, the handling mechanisms 14 of FIG. 7A need not be removable, but can instead be permanent fixtures or components of the fluid permeable filter removal device 10. Accordingly, FIG. 7B further depicts the system of FIG. 7A from a perspective view, in which the handling mechanisms 14 of the fluid permeable filter removal device 10 are no longer included in the fluid permeable filter removal device 10. As an alternative, FIG. 8A depicts an exploded view of a system in which the filter 22 is securely coupled directly to the fluid impermeable filter removal device 26, and FIG. 8B further depicts the system of FIG. 8A from a perspective view.

As with the fluid permeable filter removal device 10, the rigid barrier layer 12 of the fluid impermeable filter removal device 26 can have a shape forming one or more faces (e.g., surfaces 18, 20) that are generally rectangular, circular, triangular, square, polygonal, or another shape. The faces (e.g., surfaces 18, 20) of the rigid barrier layer 12 of the fluid impermeable filter removal device 26 can conform to a shape of the primary filtration surface 24 on the filter 22 or to a shape of the fluid permeable filter removal device 10. Accordingly, one or more of the surfaces 18, 20 of the fluid impermeable filter removal device 26 can be sized to extend across and cover substantially all of either (a) the primary filtration surface 24 of the filter 22 or (b) the fluid permeable filter removal device 10, when coupled and secured thereto. Alternatively, one or more the surfaces 18, 20 can be sized to extend across and cover a portion (e.g., a highest risk or most contaminated portion) of the filtration surface 24. Accordingly, when coupled to the filter 22 or the fluid permeable filter removal device 10, the fluid impermeable filter removal device 26 can sufficiently protect a maintenance worker or other user from contact with one or more substances (e.g., contaminants) situated in or on the primary filtration surface 24.

Figure 9A:
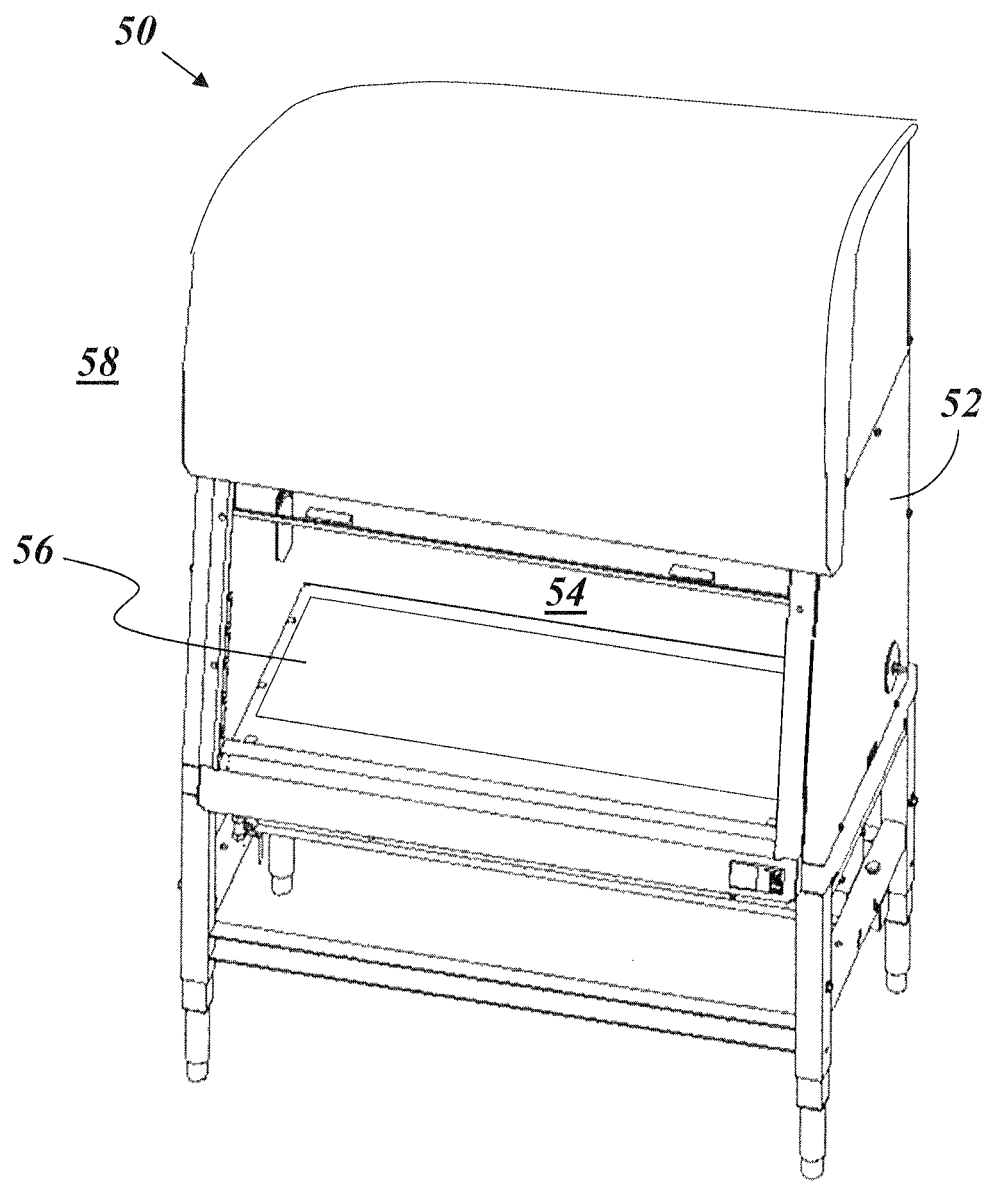
FIG. 9A is a perspective view of a biosafety cabinet with a work surface situated therein, according to aspects of the present invention.
Figure 9B:
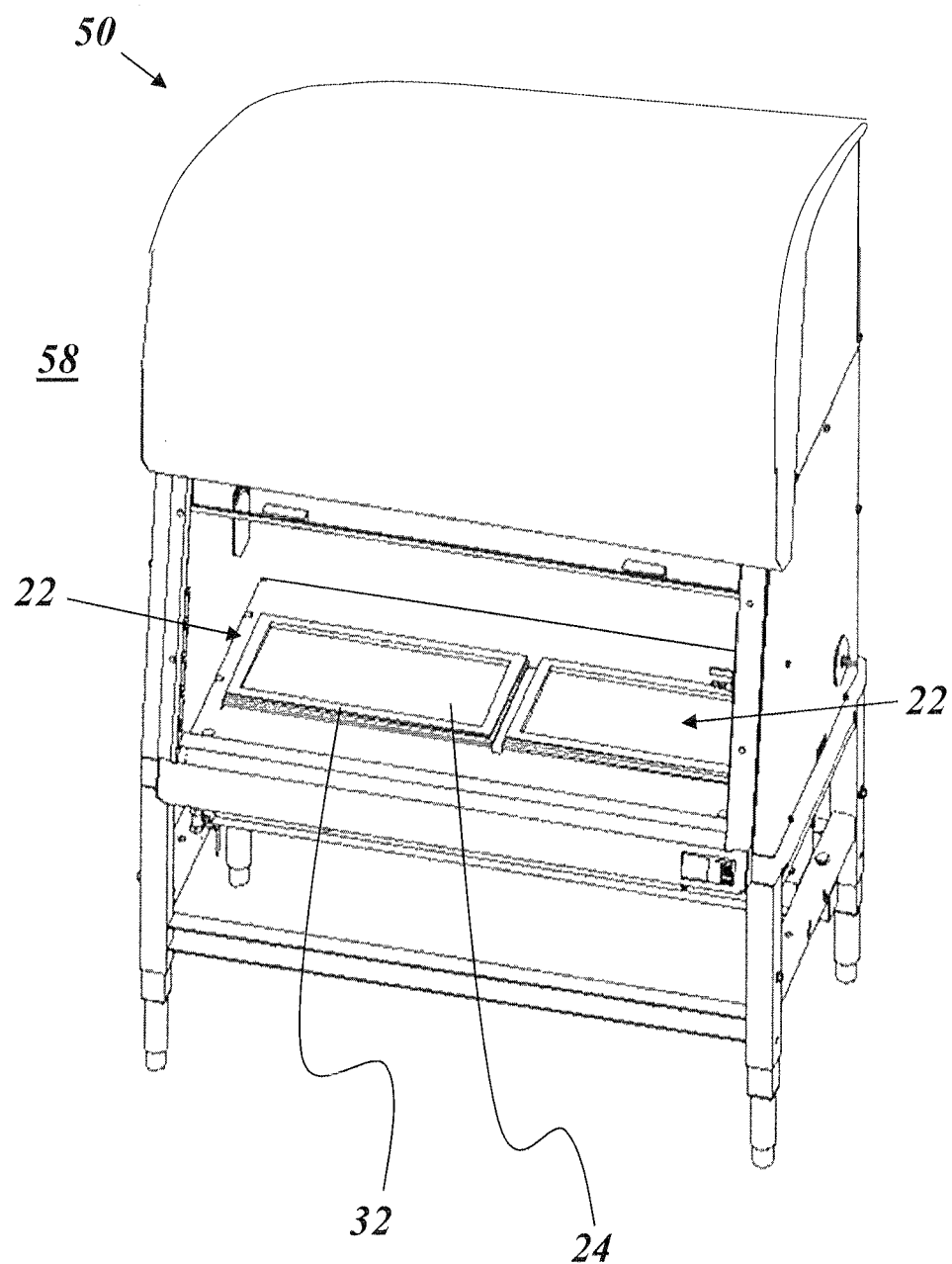
FIG. 9B is a perspective view of the biosafety cabinet of FIG. 9A with the work surface removed therefrom, according to aspects of the present invention.

Filter removal devices according to embodiments of the present invention (e.g., fluid permeable filter removal devices 10 and/or fluid impermeable filter removal devices 26) can be used with, included (e.g., in a kit) with, or included in a biosafety cabinet. For example, FIG. 9A depicts a perspective view of an example of a biosafety cabinet 50 that includes one or more walls forming a housing 52, a work area 54 contained within the housing 52, and a removable work surface 56 contained in the work area 54 and elevated about one or more filters 22 (not visible in FIG. 9A). FIG. 9B further depicts the biosafety cabinet 50 with the removable work surface 56 removed, thereby exposing the one or more filters 22 included beneath the removable work surface 56. In the example embodiment of FIG. 9B, the biosafety cabinet 50 includes two filters 22. Each of the filters 22 includes a frame 32 and a primary filtration surface 24 through which gaseous flow passes and is thereby filtered. Alternatively, the biosafety cabinet 50 can include just a single filter 22, or more than two filters 22.

Figure 10:
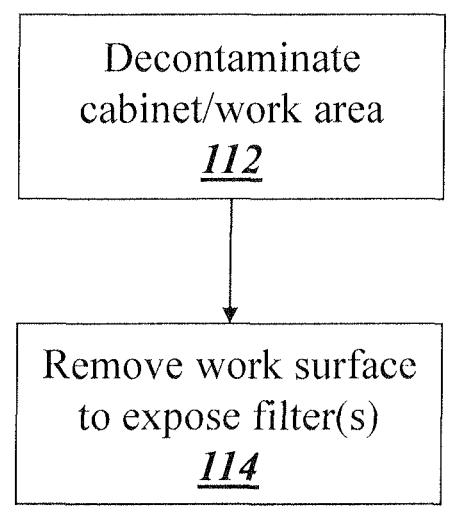
FIG. 10 is a flowchart depicting a method for completing one or more preliminary tasks prior to removing a filter from a biosafety cabinet, according to example embodiments of the present invention.

A plurality of different methods for using filter removal devices (e.g., the fluid permeable filter removal devices 10 and optionally also the fluid impermeable filter removal devices 26) will now be described with reference to FIGS. 10 through 14, according to various example embodiments of the present invention. FIG. 10 depicts a method for performing one or more optional preliminary tasks prior to removing one or more filters 22 of a biosafety cabinet 50. For example, the biosafety cabinet 50 and work area 54 can undergo decontamination (step 112), e.g., using an industry accepted method. Additionally or alternatively, the removable work surface 56 can be removed to expose the one or more filters 22 (step 114), thereby providing a maintenance worker, etc. access to the one or more filters 22.

Figure 11:
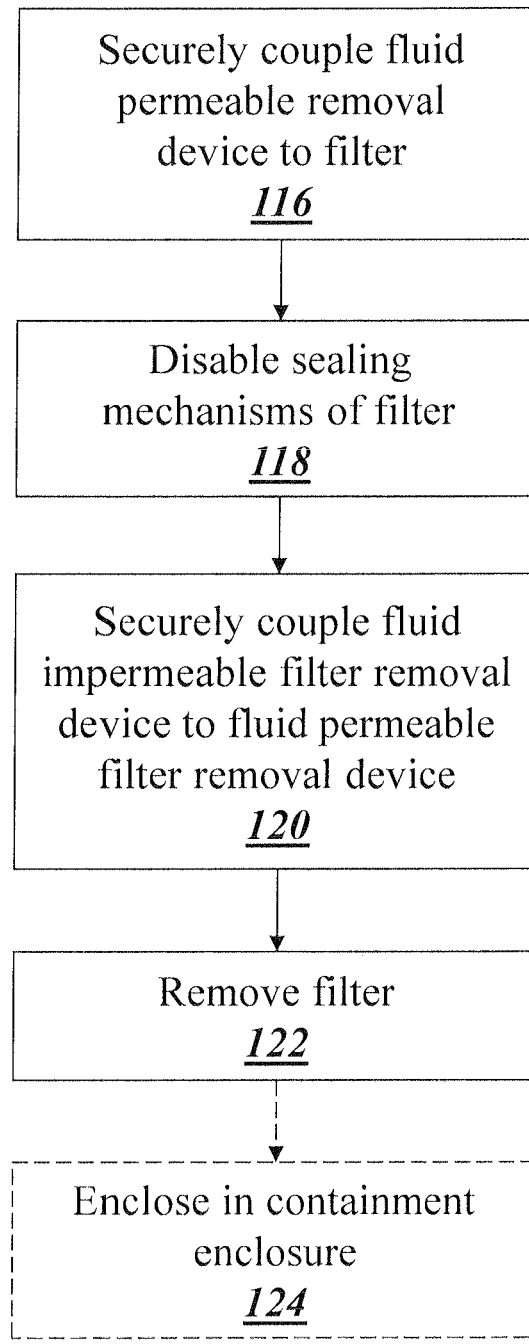
FIG. 11 is a flowchart depicting a method for removing a filter from a biosafety cabinet having one filter, according to example embodiments of the present invention.

FIG. 11 depicts an example method according to embodiments of the present invention for removal of a filter from a biosafety cabinet 50 that includes only one filter 22. A fluid permeable filter removal device 10 according to embodiments of the present invention is securely coupled to the sole filter 22 in the biosafety cabinet 50 (step 116). The fluid permeable filter removal device 10 can include one or more removable handling mechanisms 14 that are removed subsequent to securely coupling the fluid permeable filter removal device 10 to the sole filter 22. In further illustrative embodiments, the step 116 of securely coupling the fluid permeable filter removal device 10 to the sole filter 22 occurs as air (and/or other fluid) continues to flow through the work area 54, through the filter, and at least partially out of the housing 52. In this manner, the fluid permeable filter removal device 10 can be placed on the sole filter 22 in a manner that maintains air flow from the external environment 58 into work area 54. This maintains a negative pressure in the work area 54 relative to the external environment 58, which prevents contaminants from escaping the work area 54 (e.g., through an opening exposed by a sash oriented in an open configuration).

Once the fluid permeable filter removal device 10 is securely coupled to the filter 22, one or more sealing mechanisms of the filter 22 can be disabled (step 118), so as to allow air flow (and/or other fluidic flow) past one or more sides of the filter 22 whereat the filter 22 was formerly sealed. A fluid impermeable filter removal device 26 according to embodiments of the present invention then can be coupled to the fluid permeable filter removal device 10 (step 120). Accordingly, subsequent to performing step 120, gaseous flow (or other fluidic flow) through the work area 54 and into the filter 22 may continue to flow, e.g., at the edges of the filter 22 whereat the one or more sealing mechanisms were disabled. The fluid impermeable filter removal device 26 is sized and shaped to sufficiently extend across and cover an entirety of the fluid permeable filter removal device 10, such that placing the fluid impermeable filter removal device 26 in step 120 prevents gas (or other fluid) from flowing through the primary filtration surface 24 covered by the fluid permeable filter removal device 10. Accordingly, subsequent to step 120, the primary filtration surface 24 is secured and not in fluid communication with the work area 54, yet gas (or other fluid) is still enabled to flow from the work area 54 past the sole filter 22, around the edges. Accordingly, this maintains the negative pressure in the work area 54 relative to the external environment 58, thereby maintaining protection of the user or maintenance worker.

Figure 12A:
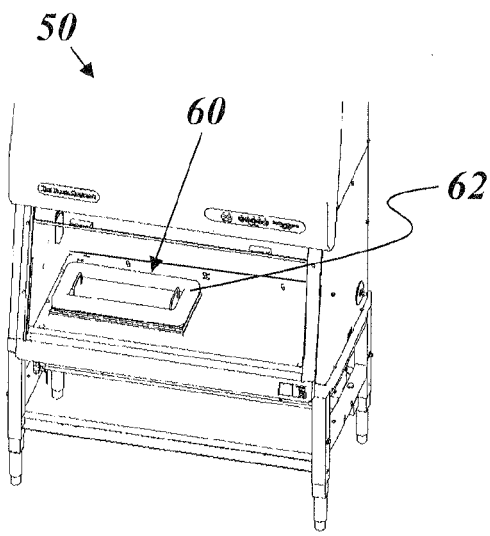
FIGS. 12A through 12D are perspective views of a biosafety cabinet during various stages during removal of a filter therefrom, according to aspects of the present invention.
Figure 12B:
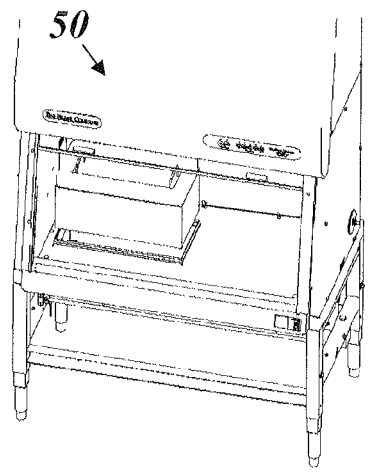
Figure 12C:
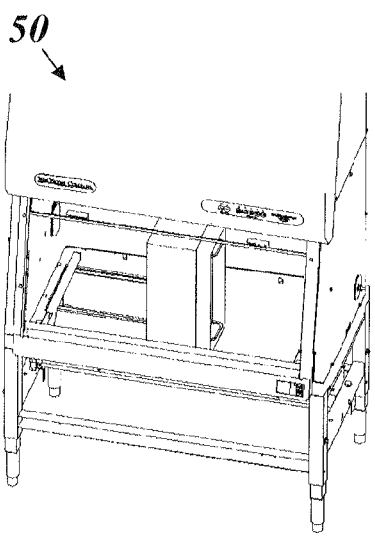
Figure 12D:
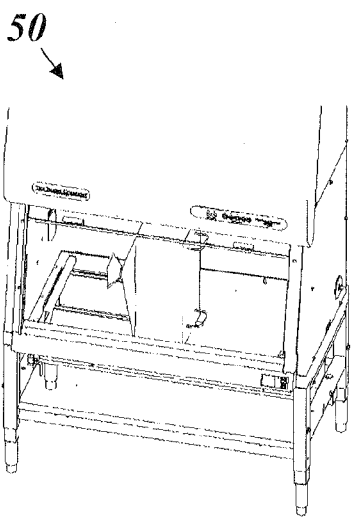

FIG. 12A depicts the biosafety cabinet 50 subsequent to steps 116 through 120. As depicted, the fluid impermeable filter removal device 26 can include a containment enclosure 60 situated on the fluid permeable filter removal device 10 in such a way that the containment enclosure 60 covers the surface 20 of the fluid impermeable filter removal device 26 facing the fluid permeable filter removal device 10. Accordingly, the step 120 of securely coupling the fluid impermeable filter removal device 26 to the fluid permeable filter removal device 10 further can include placing the containment enclosure 60 between the fluid permeable filter removal device 10 and the fluid impermeable filter removal device 26. Thus, subsequent to step 120, the containment enclosure 60 is sandwiched between the fluid permeable filter removal device 10 and the fluid impermeable filter removal device 26, as illustrated in FIG. 12A. In the example embodiment of FIG. 12A, the containment enclosure 60 (e.g., a flexible, fluid impermeable plastic bag) has edges that are folded over to form flaps 62 situated on a surface of the fluid impermeable filter removal device 26 facing away from the fluid permeable filter removal device 10. The flaps 62 are accessible for gripping by a user or maintenance worker, in order to pull the containment enclosure 60 around the sole filter 22 once removed from its place. Accordingly, the fluid permeable filter removal device 10, the fluid impermeable filter removal device 26, and the sole filter 22 form the system depicted in FIGS. 7A and B, along with the containment enclosure 60 positioned between the fluid permeable filter removal device 10 and the fluid impermeable filter removal device 26.

Referring again to FIG. 11, the sole filter 22 then can be removed (step 122). In particular, the sole filter 22 can be lifted out of a cavity in which it is contained (depicted in FIG. 12B) and placed on one of its sides within the work area 54 (depicted in FIG. 12C). The removed filter 22 can be enclosed in the containment enclosure 60 (step 124). For example, in the example embodiment depicted in FIGS. 12A through 12D in which the containment enclosure 60 is sandwiched between the fluid permeable filter removal device 10 and the fluid impermeable filter removal device 26, the accessible flaps 62 of the containment enclosure 60 are pulled along the exposed sides of the filter 22 until the filter 22 is fully contained therein. Once the sole filter 22 is completely situated inside the containment enclosure 60, the open ends of the containment enclosure 60 can be sealed (e.g., zipped together, tied together, etc.), so as to enclose and secure the sole filter 22 therein (depicted in FIG. 12D). The containment enclosure 60 then can be safely disposed of. Alternatively, in embodiments where the containment enclosure 60 is not sandwiched between the fluid permeable filter removal device 10 and the fluid impermeable filter removal device 26 in step 120, the containment enclosure 60 can be positioned to enclose all of the sole filter 22, the fluid permeable filter removal device 10, and the fluid impermeable filter removal device 26 subsequent to step 122 of removing the sole filter 22.

In some embodiments, the step 124 of enclosing the sole filter 22 within the containment enclosure 60 may not be required. For example, one of skill in the art would appreciate that it may be sufficient, in certain applications, to remove the sole filter 22, wipe down the sole filter 22 within the work area 54, and then dispose of the sole filter 22 within further decontamination or enclosing.

Figure 15A:
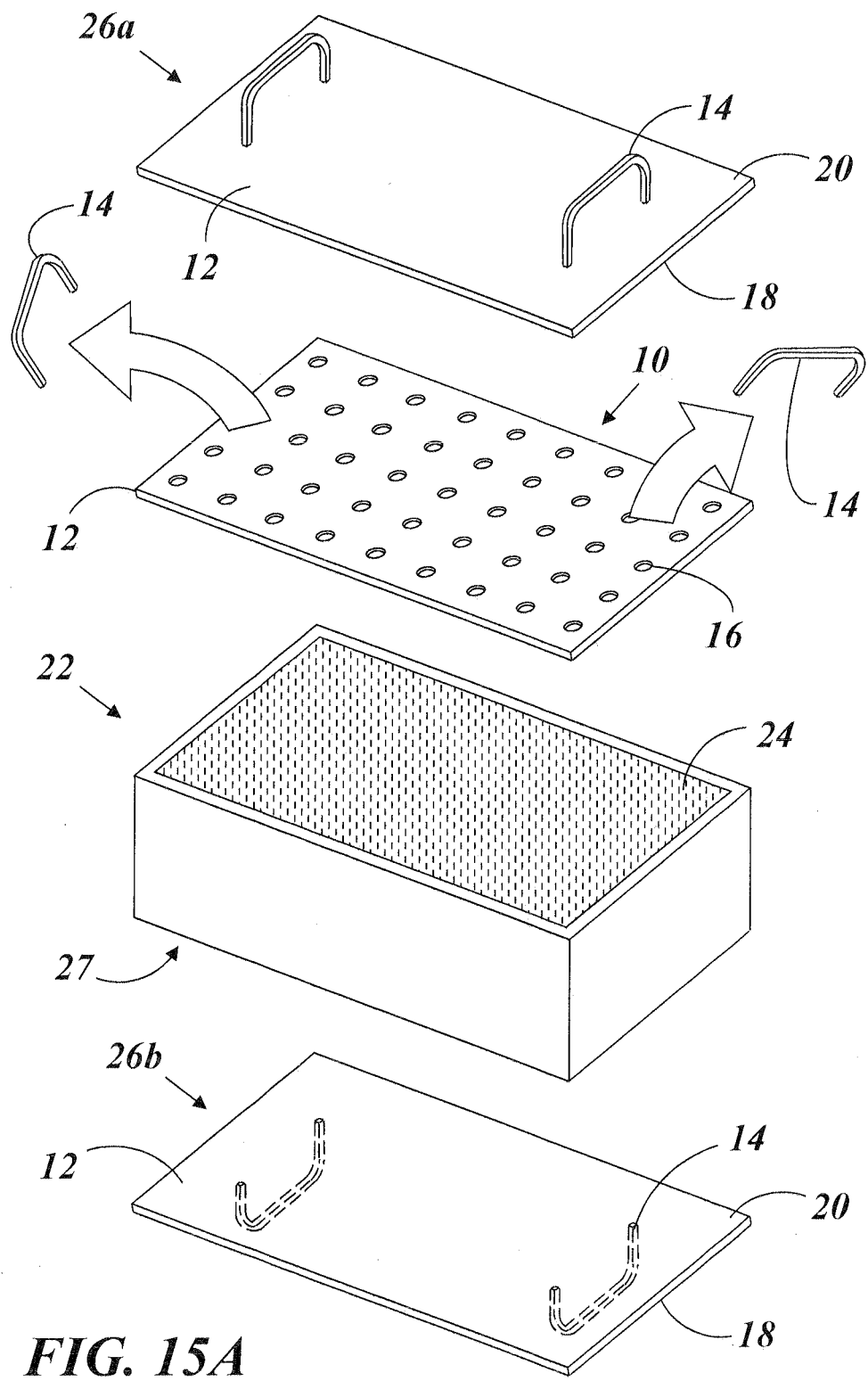
FIG. 15A is an exploded view of a filter with a fluid permeable filter removal device coupled thereto, and with two fluid impermeable filter removal devices coupled thereto, according to example embodiments of the present invention.
Figure 15B:
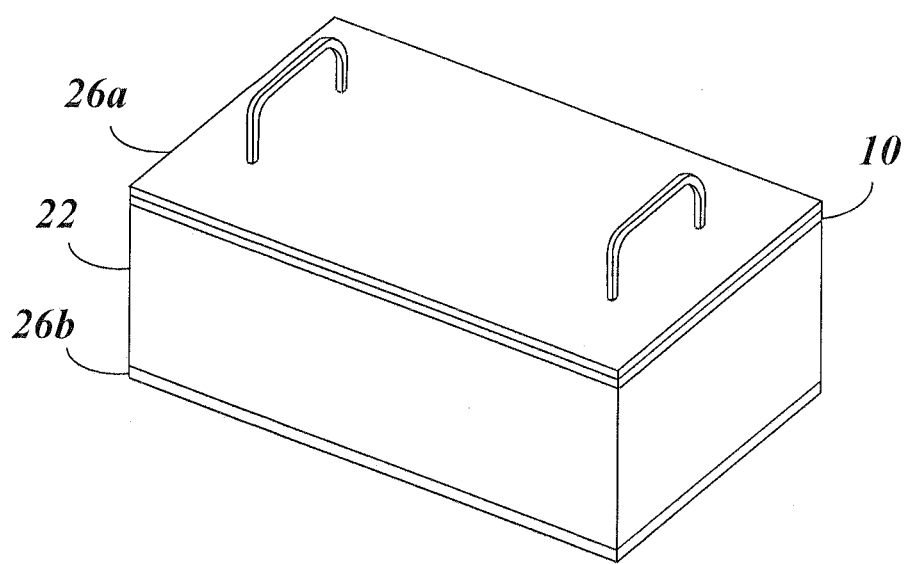
FIG. 15B is a perspective view of a filter of FIG. 15A with the fluid permeable filter removal device coupled thereto, and with two fluid impermeable filter removal devices coupled thereto, according to example embodiments of the present invention.

Furthermore, other enclosure mechanisms are possible. For example, as depicted in FIGS. 15A and 15B, instead of or in addition to utilizing the containment enclosure 60, an additional fluid impermeable filter removal device 26b can be secured to an additional, exposed side 27 of the filter 22 through which fluid is configured to flow, as would be appreciated by one of skill in the art. This additional fluid impermeable filter removal device 26b can be utilized in addition to the first fluid impermeable filter removal device 26a. In the non-limiting example of FIGS. 15A and 15B, the additional side 27 of the filter 22 is substantially opposite from the primary filtration surface 24, such that the flow path of fluid through the filter is substantially straight and unbent. Specifically, FIG. 15A depicts an exploded view of the filter 22, the fluid permeable filter removal device 10 (e.g., with removably attached handling mechanisms 14 that are disengaged from the rigid barrier layer 12 after placement of the rigid barrier layer 12 over the filter 22), the first fluid impermeable filter removal device 26a, and the second fluid impermeable filter removal device 26b. FIG. 15A depicts a perspective view of the filter 22, the fluid permeable filter removal device 10, the first fluid impermeable filter removal device 26a, and the second fluid impermeable filter removal device 26b. As depicted in the example embodiment of FIGS. 15A and 15B, the two fluid impermeable filter removal device's 26a, 26b sandwich the sole filter 22. This may eliminate the need for a containment enclosure 60 altogether. In such embodiments, the second fluid impermeable filter removal device 26b can be coupled to the opposing, exposed side 27 of the filter 22 subsequent to lifting the filter 22 out of its place in the biosafety cabinet 50 and placing it within the work area 54.

Figure 13:
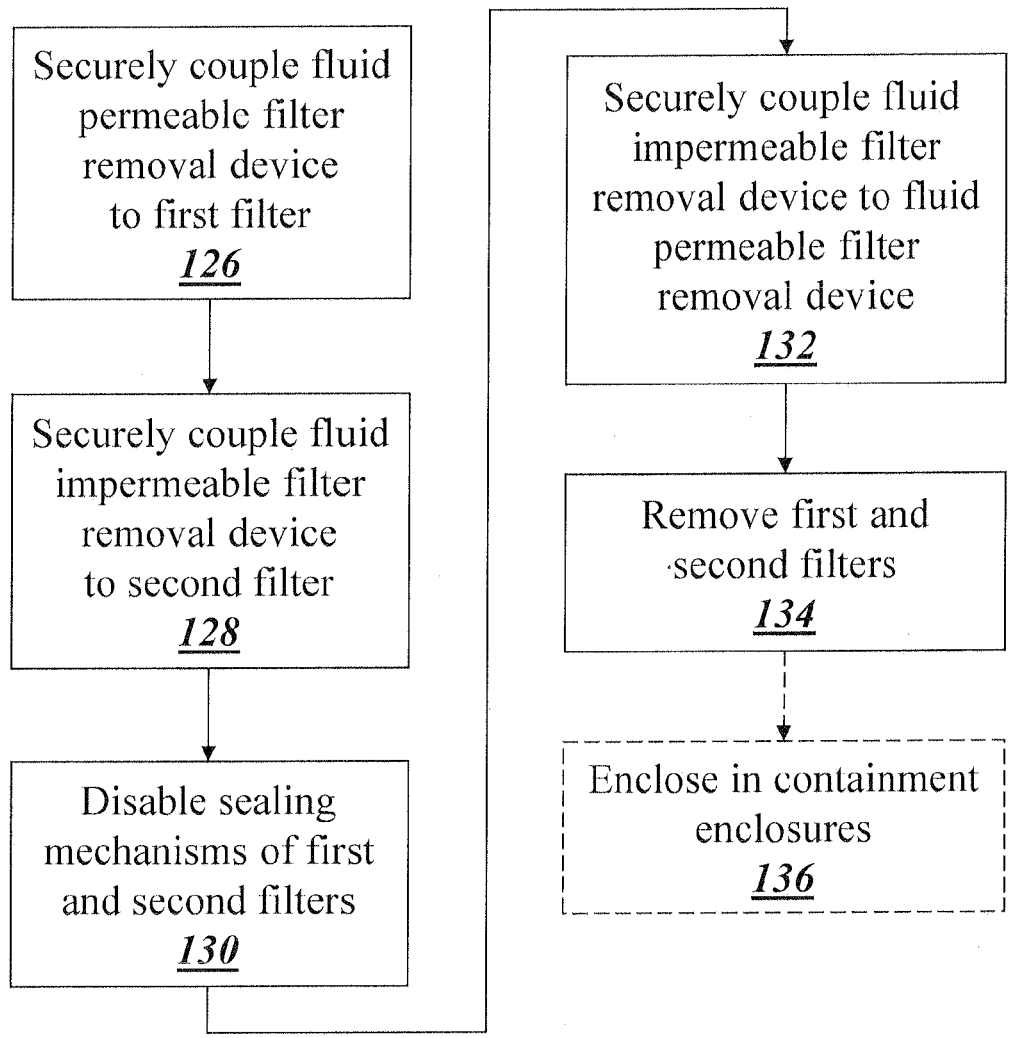
FIG. 13 is a flowchart depicting a method for removing two filters from a biosafety cabinet having two filters, according to example embodiments of the present invention.

FIG. 13 depicts another illustrative method according to embodiments of the present invention for removal of a filter from a biosafety cabinet 50 having a first filter 22 and a second filter 22. A fluid permeable filter removal device 10 according to other embodiments of the present invention can be securely coupled to the first filter 22 (step 126). The fluid permeable filter removal device 10 can include one or more removable handling mechanisms 14 that are removed subsequent to securely coupling with the first filter 22. In general, the step 126 of securely coupling the fluid permeable filter removal device to the first filter 22 can be performed as described above, e.g., in a manner that allows air (and/or other fluid) to continue flowing from the external environment 58 to the work area 54 to the filter 22 and eventually out (at least in part) to the external environment 58. Accordingly, negative pressure within the work area 54 relative to the external environment 58 can be maintained to promote an inflow of air that prevents contaminant from exiting the work area 54.

Once the fluid permeable filter removal device 10 is securely coupled to the first filter 22, a fluid impermeable filter removal device 26 according to embodiments of the present invention can be securely coupled to the second filter 22 (step 128). One or more sealing mechanisms of the first and the second filters 22 can be disabled (step 130). Step 130 of disabling the sealing mechanisms can occur subsequent to completing steps 126 and 128. Alternatively, the step 130 can be completed immediately following each of step 126 and step 128. For example, the sealing mechanisms of the first filter 22 can be removed subsequent to placing the fluid permeable filter removal device 10 on the first filter 22, and the sealing mechanisms of the second filter 22 can be removed subsequent to placing the fluid impermeable filter removal device 26 on the second filter 22. Given that at least one of the filters 22 is covered by a fluid permeable filter removal device 10, air flow (or other fluidic flow) is enabled to continue to cycle from the external environment 58 to the work area 54, thereby maintaining the protective inflow of air into the work area 54.

Continuing with FIG. 13, a fluid impermeable filter removal device 26 according to embodiments of the present invention is coupled to the fluid permeable filter removal device 10 on the first filter 22 (step 132). Accordingly, the combination of the first filter 22, the fluid permeable filter removal device 10 coupled thereto, and the fluid impermeable filter removal device 26 coupled thereto form the system depicted in FIGS. 7A and 7B. The first and second filters 22 next can be removed, e.g., by lifting out of place (step 134). The first and second filters 22 can be placed on one of their sides within the work area 54. Step 134 can be performed in the manner described above with reference to step 122 and FIGS. 12B through 12D. The first and the second filters 22, with the fluid permeable filter removal devices 10 coupled thereto, can be enclosed and sealed in one or more containment enclosures 60 (step 136) and disposed of, e.g., as described above with reference to step 124. For example, each fluid impermeable filter removal device 26 can have a containment enclosure 60 positioned thereon, such that the flaps 62 can be easily pulled over each of the filters 22 to thereby enclose the filters 22, as described previously herein.

The method steps described herein need not follow the particular order provided in the figures. Rather, steps can be reordered or performed simultaneously, as would be appreciated by one of skill in the art upon reading the present specification. For example, in FIG. 13, the second filter 22 can be removed from its place and set within the work area 54 of the biosafety cabinet 50 prior to performing step 132 of coupling the fluid impermeable filter removal device 26 to the fluid permeable filter removal device 10. Furthermore, the first filter 22 can be removed from its place and set within the work area 54 of the biosafety cabinet 50 prior to step 132 of coupling the fluid impermeable filter removal device 26. It should be appreciated that in embodiments where a single filter 22 is removed using both a fluid permeable filter removal device 10 and a fluid impermeable filter removal device 26 coupled thereto, the fluid impermeable filter removal device 26 generally can be coupled to the filter 22 subsequent to lifting the filter 22 out of place and into the work area 54 of the biosafety cabinet 50. Furthermore, it should be appreciated that in such embodiments where a single filter 22 is removed using both a fluid permeable filter removal device 10 and a fluid impermeable filter removal device 26 coupled thereto, the fluid impermeable filter removal device 26 can be coupled to the filter 22 via the fluid permeable filter removal device 10, or can be coupled directly to the filter 22 (e.g., can be in direct contact with the frame of the filter 22).

Although FIG. 13 is described with reference to a biosafety cabinet 50 having only two filters 22, it should be appreciated that the method of FIG. 13 similarly can be used for the removal of three, four, five, six, seven, eight, nine, ten, etc. filters 22 all contained in a single biosafety cabinet 50. Any additional filter 22 included in the biosafety cabinet 50 beyond the second filter 22 can be treated in substantially the same manner as either the first filter 22 or the second filter 22, as described herein. For example, for a biosafety cabinet 50 having a plurality of filters 22, a fluid permeable filter removal device 10 can be securely coupled to each of the plurality of filters 22 except for one (step 126). A fluid impermeable filter removal device 26 can be securely coupled to the sole remaining filter 22 (step 128). The steps 130 through 136 then can be followed as described above. Alternatively, for such a biosafety cabinet 50 having a plurality of filters 22, a fluid permeable filter removal device 10 can be coupled to a first filter 22 of the plurality of filters 22. All of the filters 22 then can be removed, one at a time, by coupling a fluid impermeable filter removal device 26 thereto. For example, a fluid impermeable filter removal device 26 can be coupled to fluid permeable filter removal device 10 (which is coupled to the first filter 22), and the first filter then can be removed. Subsequently, each remaining filter 22 can be removed using a fluid impermeable filter removal device 26, e.g., successively in a piecemeal fashion.

Figure 14:
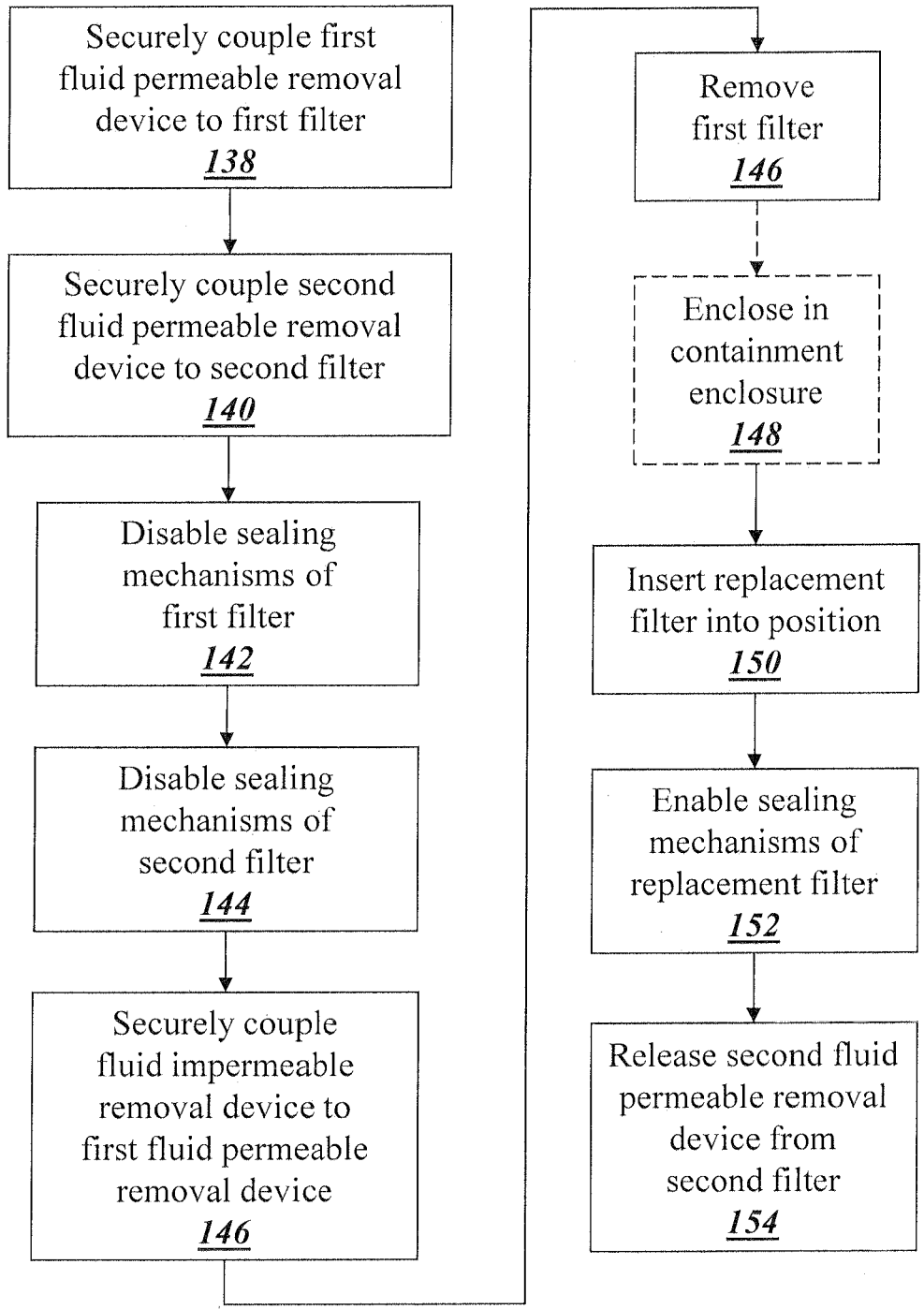
FIG. 14 is a flowchart depicting a method for removing fewer than all of the filters in a biosafety cabinet, according to example embodiments of the present invention.

FIG. 14 depicts yet another example method for situations in which it is desirable to remove and replace only some of the filters 22 contained in a single biosafety cabinet 50 (typically filters are at least removed in pairs, but while the present invention can accommodate this convention, it does not require removal in pairs). FIG. 14 will now be described in connection with an example embodiment of a biosafety cabinet 50 having a first filter 22 which is desired to be removed and a second filter 22 which is desired to remain in place. A first fluid permeable filter removal device 10 according to embodiments of the present invention can be coupled to the first filter 22 (step 138), in the manner described above to maintain air (and/or other fluidic) flow into the work area 54 from the external environment 58. The first fluid permeable filter removal device 10 can include one or more removable handling mechanisms 14 that are removed subsequent to securely coupling with the first filter 22. A second fluid permeable filter removal device 10 according to embodiments of the present invention can be securely coupled to the second filter 22 (step 140). One or more sealing mechanisms of the first filter 22 can be disabled (step 142) and one or more sealing mechanisms of the second filter 22 can be disabled (step 144). Subsequently, a fluid impermeable filter removal device 26 according to embodiments of the present invention can be securely coupled to the first fluid permeable filter removal device 10 on the first filter 22 (step 146). As with the examples above, the fluid impermeable filter removal device 26 can include a containment enclosure 60 situated thereon (in particular, see description above with reference to step 120 of FIG. 11 and FIGS. 12B through 12D). Subsequently, the first filter 22 and the first fluid permeable filter removal device 10 coupled thereto can be enclosed and sealed in the containment enclosure 60 (step 148), and safely disposed of A replacement filter 22 can be inserted into position into the cavity formerly occupied by the first filter 22 (step 150). The sealing mechanisms of the replacement filter can be enabled (step 152). The second fluid permeable filter removal device 10 can be released from the second filter 22 and removed from the biosafety cabinet 50 (step 152).

Furthermore, still other embodiments are possible. For example, for a biosafety cabinet 50 having multiple filters 22, each filter 22 can be removed (e.g., in a successive, one-at-a-time fashion) using both a fluid permeable filter removal device 10 coupled to the filter 22 and a fluid impermeable filter removal device 26 coupled to the fluid permeable filter removal device 10. One of skill in the art will appreciate a range of other ways to implement the present invention upon reading the present specification. All such alternatives and modifications are contemplated within the scope of the present invention.

Notably, embodiments of the present invention provide devices, systems, and methods that enable convenient and safe removal (and optionally also replacement) of filters 22 within a biosafety cabinet 50. By including a fluid permeable filter removal device 10, air (and/or other fluidic) flow is able to be maintained during all of the removal procedure, thereby creating a negative pressure within the work area 54 that maintains a continuous protective inflow in from the external environment 58. For example, during filter removal, the air flow (or other fluidic flow) can be maintained by continuing to operate the external cabinet exhaust system while shutting down the supply fan. In addition, the filter removal devices described herein are capable of being manufactured in a cost-effect way and are useable on a one-time basis without requiring additional filter removal equipment being installed into the biosafety cabinet 50. As such, in some illustrative embodiments of the present invention, such permanent installed filter removal equipment is not included. The filter removal devices according to embodiments of the present invention generally promote quick and convenient usage and disposal of contaminated filters, and ultimately promote greater levels of safety to users or maintenance works of biosafety cabinets 50. One of skill in the art will appreciate yet other benefits not described herein upon reading the present specification.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A biosafety system, comprising:
a biosafety cabinet device, comprising:
one or more walls forming a housing;
a work area contained within the housing; and
a first filter in fluid communication with the work area for filtering fluid passing through and exiting the work area, the first filter comprising a primary filtration surface through which a majority of fluid being filtered by the first filter passes; and
a fluid permeable filter removal device configured to couple to the first filter, the fluid permeable filter removal device comprising a rigid barrier layer and one or more handling mechanisms adjoined with the rigid barrier layer and extending distal to the rigid barrier layer;
wherein when the fluid permeable filter removal device is securely coupled to the first filter, the rigid barrier layer extends substantially across a non-peripheral portion of the primary filtration surface of the first filter and allows passage of fluid from the work area through the primary filtration surface of the first filter.

2. The biosafety system of claim 1, wherein the biosafety cabinet device further comprises a second filter in fluid communication with the work area for filtering fluid passing through and exiting the work area, the second filter comprising a primary filtration surface through which a majority of fluid being filtered by the second filter passes, and wherein the system further comprises:
a fluid impermeable filter removal device configured to couple to the second filter, the fluid impermeable filter removal device comprising a rigid barrier layer and one or more handling mechanisms adjoined with the rigid barrier layer and extending distal to the rigid barrier portion;
wherein when the fluid impermeable filter removal device is securely coupled to the second filter, the rigid barrier layer extends across an entirety of the primary filtration surface of the second filter, seals off the primary filtration surface of the second filter, and prevents passage of fluid from the work area through the primary filtration surface of the second filter.

3. The biosafety system of claim 1, further comprising:
a fluid impermeable filter removal device configured to couple to the fluid permeable filter removal device, the fluid impermeable filter removal device comprising a rigid barrier layer and one or more handling mechanisms adjoined with the rigid barrier layer and extending distal to the rigid barrier portion;
wherein when the fluid impermeable filter removal device is securely coupled to the fluid permeable filter removal device, the rigid barrier layer of the fluid impermeable filter removal device extends across an entirety of at least the primary filtration surface of the first filter, seals off the primary filtration surface of the first filter, and prevents passage of fluid from the work area through the primary filtration surface of the first filter.

4. The biosafety system of claim 1, further wherein the rigid barrier layer of the fluid permeable filter removal device prevents filtered substance on or in the primary filtration surface of any filter from contacting the one or more handling mechanisms of the fluid impermeable filter removal device.

5. The biosafety system of claim 1, wherein the one or more handling mechanisms of the fluid permeable filter removal device comprise one or more of a handle, a hook, a knob, an overhanging portion, a strap, or an embossed structure.

6. The biosafety system of claim 1, wherein the one or more handling mechanisms of the fluid permeable filter removal device are removable from the rigid barrier layer of the fluid permeable filter removal device.

7. The biosafety system of claim 1, wherein the rigid barrier layer of the fluid permeable filter removal device comprises a rigid plate having one or more through-holes disposed therein.

8. The biosafety system of claim 1, further wherein the fluid permeable filter removal device is configured to releasably couple to the first filter.

9. The biosafety system of claim 1, further wherein the fluid permeable filter removal device is configured to couple to a frame of the first filter.

10. The biosafety system of claim 1, further wherein when the fluid permeable filter removal device is securely coupled to the first filter, the rigid barrier layer of the fluid permeable filter removal device extends across and covers only a portion of the primary filtration surface of the first filter.

11. The biosafety system of claim 1, further wherein when the fluid permeable filter removal device is securely coupled to the first filter, the rigid barrier layer of the fluid permeable filter removal device extends across and covers all of the primary filtration surface of the first filter.

12. The biosafety system of claim 1, further comprising a flexible containment enclosure having a size and shape sufficient to enclose the first filter and the fluid permeable filter removal device when coupled thereto.

13. The biosafety system of claim 1, wherein the rigid barrier layer of the fluid permeable filter removal device comprises a perimeter forming one or more indentations for allowing passage of fluid therethrough.

14. The biosafety system of claim 1, further comprising a fluid impermeable filter removal device configured to couple to the first filter, the fluid impermeable filter removal device comprising a rigid barrier layer and one or more handling mechanisms adjoined with the rigid barrier layer and extending distal to the rigid barrier layer, wherein the fluid impermeable filter removal device is configured to securely coupled to the first filter in such a way that the rigid barrier layer of the fluid impermeable filter removal device extends across an entirety of an additional surface of the first filter through which fluid is configured to flow and seals off the additional surface of the first filter.

15. A method for securing a first filter of a biosafety cabinet device, the first filter being in fluid communication with a work area and being configured to filter fluid passing through and exiting the work area, the first filter comprising a primary filtration surface through which a majority of fluid being filtered by the first filter passes, the method comprising:
providing a fluid permeable filter removal device comprising a rigid barrier layer and one or more handling mechanisms adjoined with the rigid barrier layer and extending distal to the rigid barrier layer; and
securely coupling the fluid permeable filter removal device to the first filter in such a way that the rigid barrier layer extends substantially across a non-peripheral portion of the primary filtration surface of the first filter and allows passage of fluid from the work area through the primary filtration surface of the first filter.

16. The method of claim 15, further comprising, subsequent to the step of securely coupling the fluid permeable filter removal device, disabling one or more sealing mechanisms sealing one or more edges of the first filter, whereby air is enabled to pass around the one or more edges of the first filter.

17. The method of claim 16, further comprising placing the first filter and the fluid permeable filter removal device coupled thereto in a containment enclosure and sealing the containment enclosure.

18. The method of claim 15, further comprising removing the first filter and the fluid permeable filter removal device coupled thereto from the biosafety cabinet.

19. The method of claim 15, further comprising:
providing a fluid impermeable filter removal device comprising a rigid barrier layer and one or more handling mechanisms adjoined with the rigid barrier layer and extending distal to the rigid barrier layer;

securely coupling the fluid impermeable filter removal device to the fluid permeable filter removal device such that the rigid barrier layer of the fluid impermeable filter removal device prevents passage of fluid from the work area through the primary filtration surface of the first filter.

20. The method of claim 19, further comprising placing the first filter, the fluid permeable filter removal device coupled thereto, and the fluid impermeable filter removal device coupled thereto in a containment enclosure, sealing the containment enclosure, and disposing of the containment enclosure.

21. The method of claim 15, further comprising, prior to the step of coupling the fluid permeable filter removal device to the first filter, removing a work surface from the biosafety cabinet.

22. The method of claim 15, further comprising:
providing an additional fluid permeable filter removal device comprising a rigid barrier layer and one or more handling mechanisms adjoined with the rigid barrier layer and extending distal to the rigid barrier layer;
securely coupling the additional fluid permeable filter removal device to a second filter included in the biosafety cabinet in such a way that the rigid barrier layer extends substantially across a non-peripheral portion of the primary filtration surface of the first filter and allows passage of fluid from the work area through the primary filtration surface of the first filter.

23. The method of claim 22, further comprising:
providing a fluid impermeable filter removal device comprising a rigid barrier layer and one or more handling mechanisms adjoined with the rigid barrier layer and extending distal to the rigid barrier layer;
securely coupling the fluid impermeable filter removal device to the fluid permeable filter removal device such that the rigid barrier layer of the fluid impermeable filter removal device prevents passage of fluid from the work area through the primary filtration surface of the first filter;
removing the first filter, the fluid permeable filter removal device coupled thereto, and the fluid impermeable filter removal device coupled thereto;
releasing the additional fluid permeable filter removal device from the second filter; and
removing the released additional fluid permeable filter removal device from the biosafety cabinet.

24. The method of claim 15, further comprising:
providing a fluid impermeable filter removal device comprising a rigid barrier layer and one or more handling mechanisms adjoined with the rigid barrier layer and extending distal to the rigid barrier layer;
securely coupling the fluid impermeable filter removal device to an additional surface of the first filter through which fluid is configured to pass, such that the rigid barrier layer of the fluid impermeable filter removal device seals off the additional surface of the first filter.

* * * * *